US012603026B2

(12) United States Patent
Lim et al.

(10) Patent No.: US 12,603,026 B2
(45) Date of Patent: Apr. 14, 2026

(54) ELECTRONIC DEVICE AND METHOD FOR CONTROLLING DISPLAY OF SAME

(71) Applicant: Samsung Electronics Co., Ltd., Suwon-si (KR)

(72) Inventors: Chaehoon Lim, Suwon-si (KR); Kyoungup Kim, Suwon-si (KR); Hyungu Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/882,002

(22) Filed: Sep. 11, 2024

(65) Prior Publication Data

US 2025/0006093 A1 Jan. 2, 2025

Related U.S. Application Data

(63) Continuation of application No. 18/347,183, filed on Jul. 5, 2023, now Pat. No. 12,118,908, which is a (Continued)

(30) Foreign Application Priority Data

Jul. 1, 2022 (KR) ........................ 10-2022-0081398
Aug. 5, 2022 (KR) ........................ 10-2022-0098141

(51) Int. Cl.
*G09G 3/00* (2006.01)

(52) U.S. Cl.
CPC ..... *G09G 3/035* (2020.08); *G09G 2320/0626* (2013.01); *G09G 2320/0666* (2013.01); (Continued)

(58) Field of Classification Search
CPC ........... G09G 3/035; G09G 2320/0626; G09G 2320/0673; G09G 2320/0686; (Continued)

(56) References Cited

U.S. PATENT DOCUMENTS 10,255,481 B2 4/2019 Cho et al.
10,896,645 B2 1/2021 Lee et al.
(Continued)

FOREIGN PATENT DOCUMENTS

EP 4 235 363 A1 8/2023
KR 10-2017-0086470 A 7/2017
(Continued)

OTHER PUBLICATIONS

International Search Report dated Oct. 4, 2023, issued in International Application No. PCT/KR2023/009335.
(Continued)

*Primary Examiner* — Kenneth B Lee, Jr.
(74) *Attorney, Agent, or Firm* — Jefferson IP Law, LLP

(57) ABSTRACT

An electronic device is provided. The electronic device includes a first display driving circuit configured to control the first area of the flexible display, a second display driving circuit configured to control the second area of the flexible display, a processor, and a memory storing instructions, which when executed by the processor, cause the electronic device to: while the housing is in the flat state, display a first execution screen, corresponding to a first application, on the first area and the second area of the flexible display, while the first execution screen, corresponding to the first application, is displayed on the first area and the second area of the flexible display, identify the housing being moved from flat state to the partially folded state, based at least on the housing being moved from the flat state to the partially folded state, display a second execution screen corresponding to the first application, different from the first execution screen, on the first area and the second area of the flexible display, and while the second execution screen is displayed in the partially folded state, control the first display driving circuit and the second driving circuit such that one of the
(Continued)

first area and the second area of the flexible display, which is more closely aligned with a ground plane, consumes electrical power less than electrical power consumed by the other one of the first area and the second area of the flexible display.

22 Claims, 20 Drawing Sheets

Related U.S. Application Data continuation of application No. PCT/KR2023/009335, filed on Jul. 3, 2023.

(52) U.S. Cl.
CPC ............... *G09G 2320/0673* (2013.01); *G09G 2320/0686* (2013.01); *G09G 2330/021* (2013.01); *G09G 2340/0407* (2013.01); *G09G 2340/0435* (2013.01)

(58) Field of Classification Search
CPC ..... G09G 2330/021; G09G 2340/0407; G09G 2340/0435
See application file for complete search history.

(56) References Cited

U.S. PATENT DOCUMENTS

| | | | | |
|---|---|---|---|---|
| 11,037,498 | B2 | 6/2021 | Seo et al. | |
| 11,043,191 | B1 | 6/2021 | Kang et al. | |
| 11,240,757 | B2 | 2/2022 | Han | |
| 11,687,350 | B2 | 6/2023 | Min et al. | |
| 11,966,659 | B2 | 4/2024 | Agrawal et al. | |
| 11,978,394 | B2 | 5/2024 | Kim et al. | |
| 12,118,908 | B2 * | 10/2024 | Lim | G06F 3/04883 |
| 2014/0285449 | A1 | 9/2014 | Cho et al. | |
| 2015/0022561 | A1 | 1/2015 | Ikeda et al. | |
| 2016/0147292 | A1 | 5/2016 | Sunwoo et al. | |
| 2016/0246558 | A1 | 8/2016 | Prushinskiy et al. | |
| 2017/0322597 | A1 | 11/2017 | Lee et al. | |
| 2019/0166703 | A1 | 5/2019 | Kim et al. | |
| 2020/0326900 | A1 | 10/2020 | Kwon et al. | |
| 2020/0372875 | A1 * | 11/2020 | Iyer | G06F 1/1681 |
| 2021/0124452 | A1 | 4/2021 | Hong et al. | |
| 2021/0247805 | A1 | 8/2021 | Min et al. | |
| 2022/0044614 | A1 | 2/2022 | Yun et al. | |
| 2022/0225523 | A1 * | 7/2022 | Nguyen | H10K 77/111 |
| 2022/0269463 | A1 * | 8/2022 | Yu | G09G 3/035 |
| 2022/0286541 | A1 * | 9/2022 | Lee | H04M 1/0216 |
| 2022/0383786 | A1 * | 12/2022 | Kwak | G06F 1/1643 |

FOREIGN PATENT DOCUMENTS

| | | | |
|---|---|---|---|
| KR | 10-2020-0067799 | A | 6/2020 |
| KR | 10-2131825 | B1 | 7/2020 |
| KR | 10-2021-0050049 | A | 5/2021 |
| KR | 10-2021-0077340 | A | 6/2021 |
| KR | 10-2270681 | B1 | 6/2021 |
| KR | 10-2021-0101684 | A | 8/2021 |
| KR | 10-2021-0108037 | A | 9/2021 |
| KR | 10-2021-0119349 | A | 10/2021 |
| KR | 10-2327803 | B1 | 11/2021 |
| KR | 10-2022-0016011 | A | 2/2022 |
| KR | 10-2022-0018141 | A | 2/2022 |
| KR | 10-2022-0029775 | A | 3/2022 |
| KR | 10-2022-0081565 | A | 6/2022 |

OTHER PUBLICATIONS

European Search Report dated May 26, 2025, issued in European Application No. 23831973.5.

* cited by examiner

ELECTRONIC DEVICE AND METHOD FOR CONTROLLING DISPLAY OF SAME

CROSS-REFERENCE TO RELATED APPLICATION(S)

This application is a continuation application of prior application Ser. No. 18/347,183, filed on Jul. 5, 2023, which is a continuation application, claiming priority under § 365 (c), of an International application No. PCT/KR2023/009335, filed on Jul. 3, 2023, which is based on and claims the benefit of a Korean patent application number 10-2022-0081398, filed on Jul. 1, 2022, in the Korean Intellectual Property Office, and of a Korean patent application number 10-2022-0098141, filed on Aug. 5, 2022, in the Korean Intellectual Property Office, the disclosure of each of which is incorporated by reference herein in its entirety.

TECHNICAL FIELD

The disclosure relates to an electronic device and a method for controlling a display of the electronic device.

BACKGROUND ART

Electronic devices are gradually becoming slimmer and are being developed to exhibit increased rigidity and differentiated functional elements while the design thereof is improved. Electronic devices are gradually changing in its shape from uniform rectangular shapes to various shapes. Electronic devices may have a deformable structure capable of using a large screen display while improving portability. A large screen display is being developed from a flexible form to a fully foldable display.

A foldable electronic device having a foldable display may allow use of a display having a large area in an unfolded state and improve both usability and portability due to a reduction in the overall volume of the electronic device in a folded state.

The above information is presented as background information only to assist with an understanding of the disclosure. No determination has been made, and no assertion is made, as to whether any of the above might be applicable as prior art with regard to the disclosure.

DISCLOSURE OF INVENTION

Technical Problem

Aspects of the disclosure are to address at least the above-mentioned problems and/or disadvantages and to provide at least the advantages described below. Accordingly, an aspect of the disclosure is to provide a foldable electronic device that may be placed in a partially folded state and used depending on a user's usage pattern.

Another aspect of the disclosure is to provide control of power of a display when placing and using a foldable electronic device in a partially folded state.

Additional aspects will be set forth in part in the description which follows and, in part, will be apparent from the description, or may be learned by practice of the presented embodiments.

Solution to Problem

In accordance with an aspect of the disclosure, an electronic device is provided. The electronic device includes a flexible display, a housing configured to be movable between a flat state, a partially folded state and a fully folded state. The foldable housing comprising a first housing configured to support a first area of the flexible display, and a second housing configured to support a second area of the flexible display. The electronic device includes a first display driving circuit configured to control the first area of the flexible display, a second display driving circuit configured to control the second area of the flexible display, a processor, and a memory storing instructions, which when executed by the processor, cause the electronic device to: while the housing is in the flat state, display a first execution screen, corresponding to a first application, on the first area and the second area of the flexible display, while the first execution screen, corresponding to the first application, is displayed on the first area and the second area of the flexible display, identify the housing being moved from flat state to the partially folded state, based at least on the housing being moved from the flat state to the partially folded state, display a second execution screen corresponding to the first application, different from the first execution screen, on the first area and the second area of the flexible display, and while the second execution screen is displayed in the partially folded state, control the first display driving circuit and the second driving circuit such that one of the first area and the second area of the flexible display, which is more closely aligned with a ground plane, consumes electrical power less than electrical power consumed by the other one of the first area and the second area of the flexible display.

In accordance with another aspect of the disclosure, a method for controlling a display of an electronic device is provided. The method includes, while the electronic device is in the flat state, displaying a first execution screen, corresponding to a first application, on the first area and the second area of the flexible display, while the first execution screen, corresponding to the first application, is displayed on the first area and the second area of the flexible display, identifying the housing being moved from flat state to the partially folded state, based at least on the electronic device being moved from the flat state to the partially folded state, displaying a second execution screen corresponding to the first application, different from the first execution screen, on the first area and the second area of the flexible display, and while the second execution screen is displayed in the partially folded state, controlling a first display driving circuit and a second driving circuit such that one of the first area and the second area of the flexible display, which is more closely aligned with a ground plane, consumes electrical power less than electrical power consumed by the other one of the first area and the second area of the flexible display.

Advantageous Effects of Invention

It is possible to control consumption power of an electronic device by controlling the power of a display when placing and using a foldable electronic device of the disclosure in a partially folded state.

It is possible to increase the time of using an electronic device by controlling the power of a display when placing and using a foldable electronic device of the disclosure in a partially folded state.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms “a,” “an,” and “the” include plural referents unless the context clearly dictates otherwise. Thus, for example, reference to “a component surface” includes reference to one or more of such surfaces.

Figure 1:
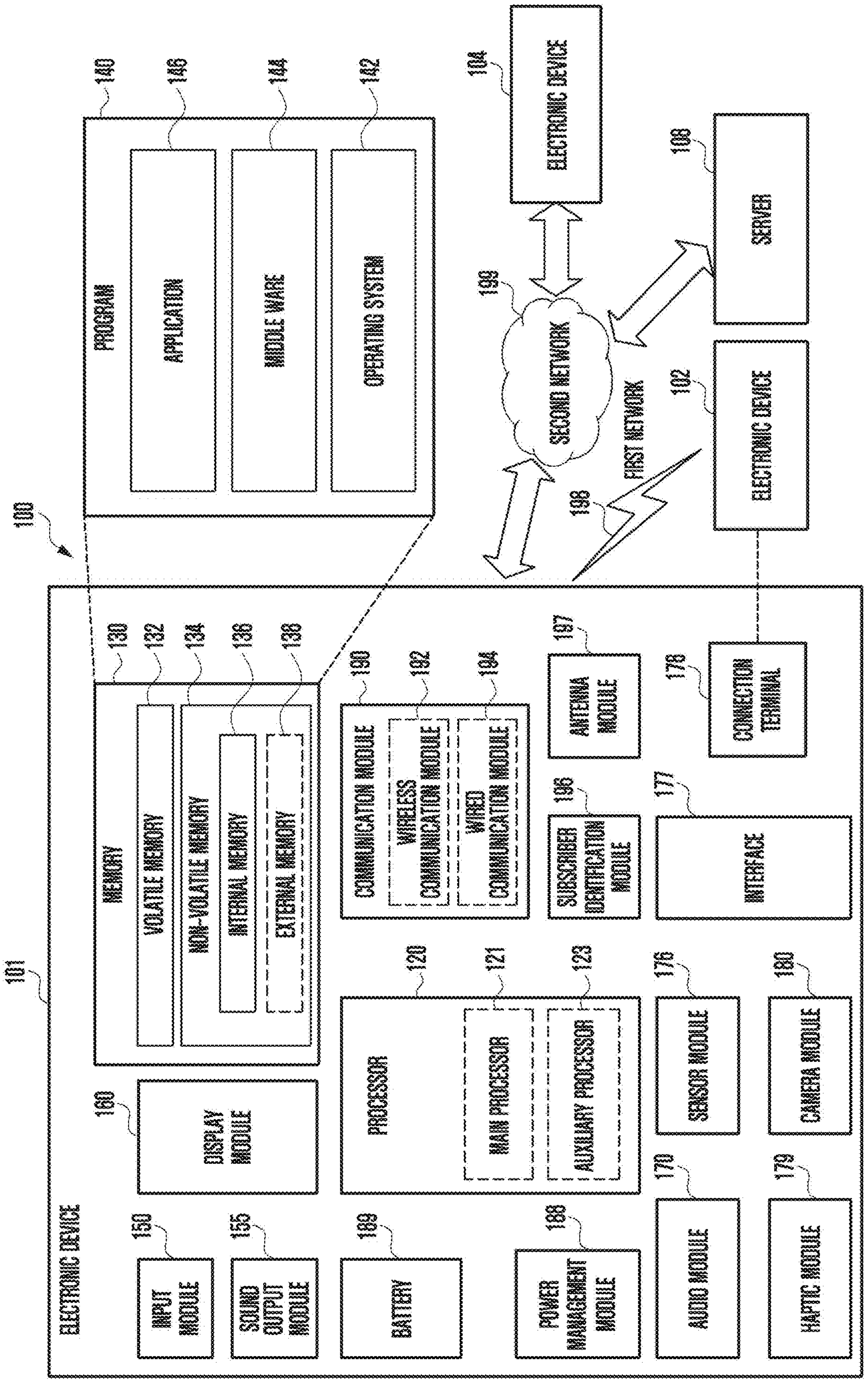
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In some embodiments, at least one of the components (e.g., the connection terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., the electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

The connection terminal 178 may include a connector via which the electronic device 101 may be physically connected with the external electronic device (e.g., the electronic device 102). According to an embodiment, the connection terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 gigabits per second (Gbps) or more) for implementing eMBB, loss coverage (e.g., 164 decibels (dB) or less) for implementing mMTC, or U-plane latency (e.g., 0.5 milliseconds (ms) or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mm Wave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices (e.g., the electronic devices 102 and 104 or the server 108). For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
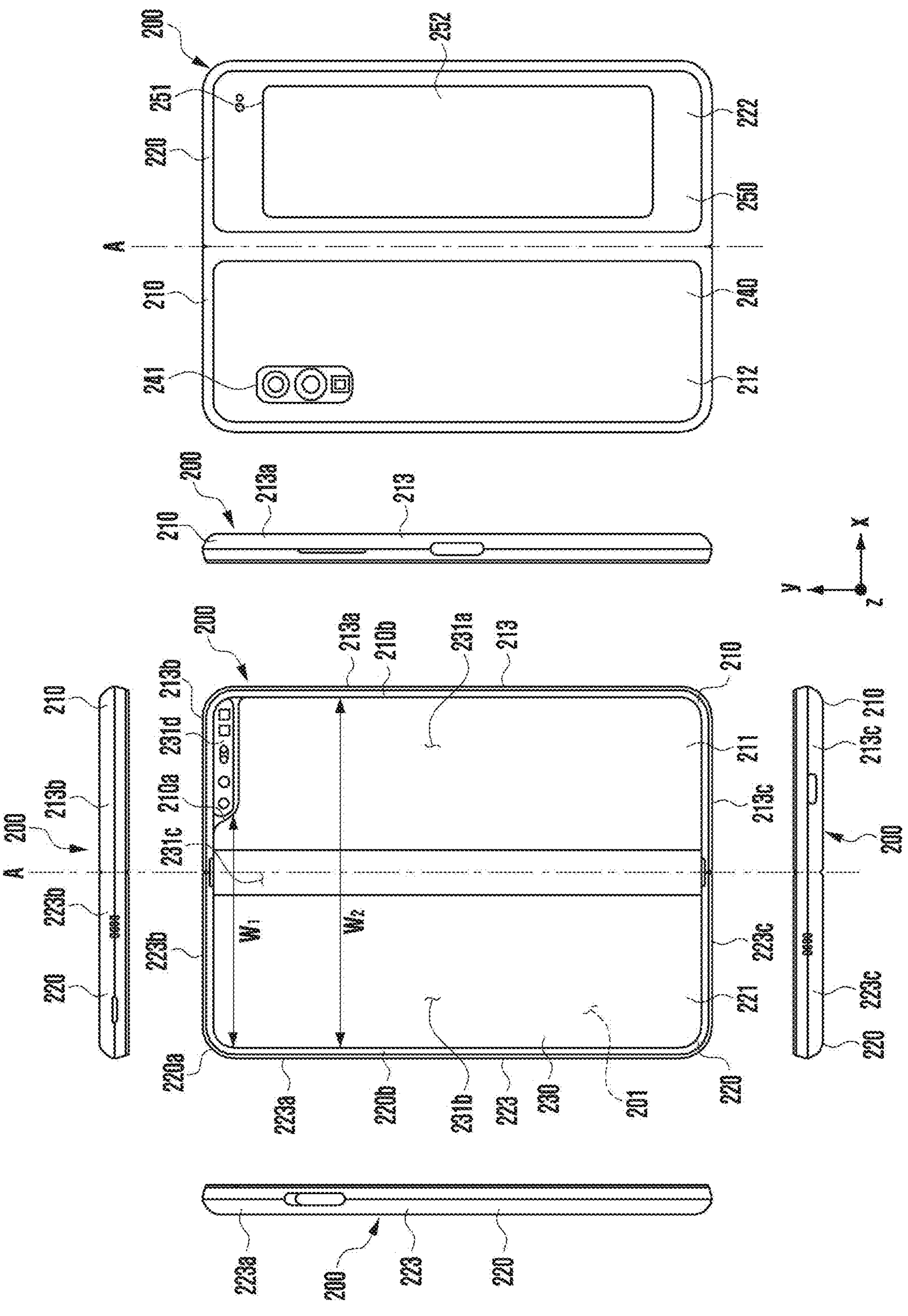
FIG. 2A is a diagram illustrating a flat state of an electronic device according to an embodiment of the disclosure.
Figure 2B:
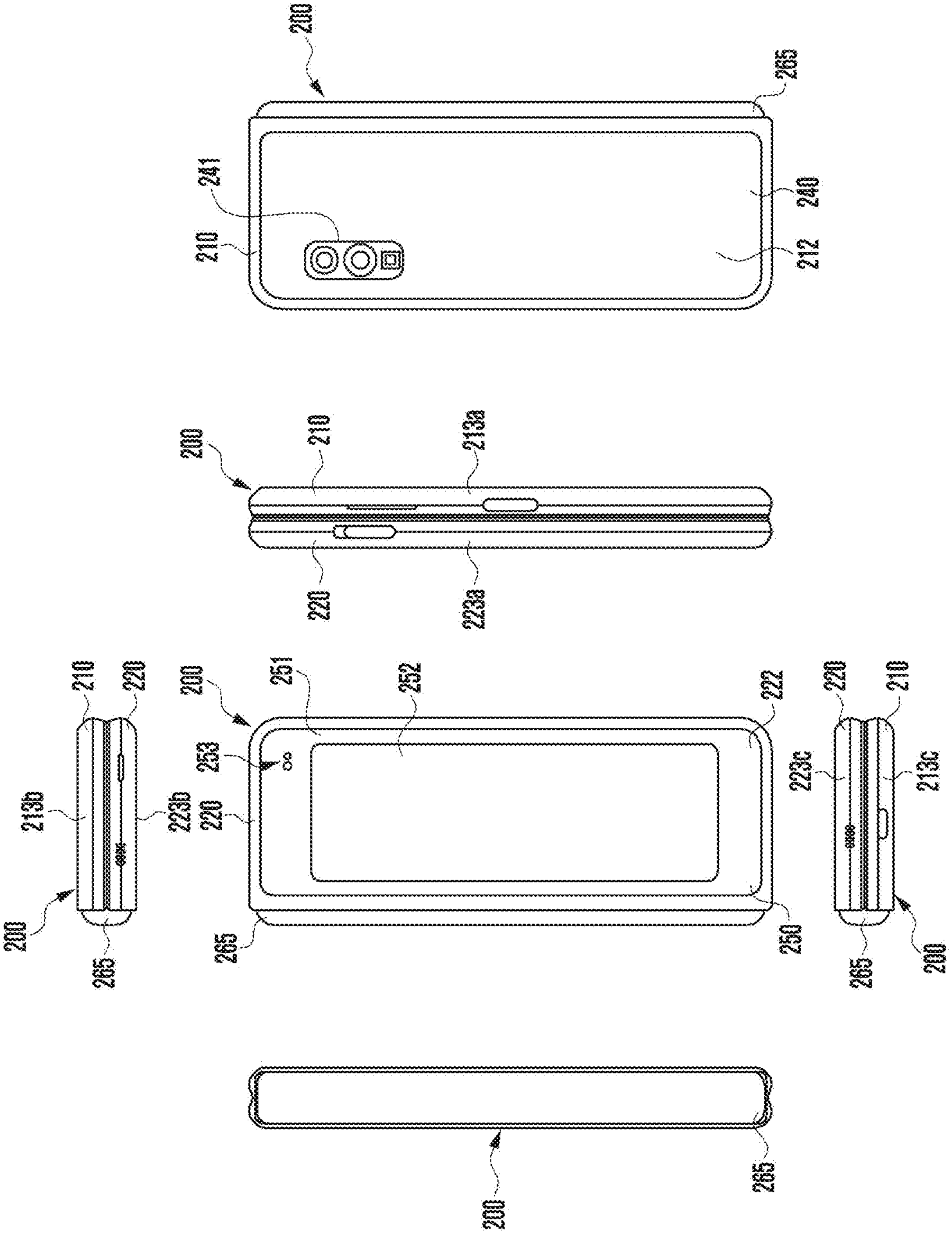
FIG. 2B is a diagram illustrating a fully folded state of the electronic device in FIG. 2A according to an embodiment of the disclosure.

FIG. 2A is a diagram illustrating a flat state of an electronic device according to an embodiment of the disclosure. FIG. 2B is a diagram illustrating a fully folded state of the electronic device in FIG. 2A according to an embodiment of the disclosure.

Referring to FIG. 2A, an electronic device 200 (e.g., the electronic device 101 in FIG. 1) may include a first housing structure or a first housing 210 and a second housing structure or a second housing 220 including at least one space in which at least one display is able to be disposed, at least one display 230 disposed in the at least one space (e.g., a flexible display, a foldable display, or a first display), a second display (e.g., a sub-display) disposed on one side of the second housing structure 220, a hinge structure (e.g., hinge structure 264 in FIG. 3) in which the first housing structure 210 and the second housing structure 220 are configured to be folded relative to each other, and a hinge cover (e.g., hinge cover 265 in FIG. 3) covering foldable portions of the first housing structure 210 and the second housing structure 220. In this document, the surface on which the at least one display (e.g., a flexible display (or first display)) 230 is disposed may be defined as a front surface of the electronic device 200, and the surface opposite the front surface may be defined as a rear surface of the electronic device 200. In addition, a surface surrounding the space between the front surface and the rear surface may be defined as a side surface of the electronic device 200.

The electronic device 200 in FIGS. 2A and 2B may include the same elements as those of the electronic device 101 in FIG. 1. The electronic device 200 in FIGS. 2A and 2B may be the same as the electronic device 101 in FIG. 1.

In an embodiment, a pair of housing structures 210 and 220 may include a first housing structure 210 including a sensor area 231*d*, a second housing structure 220, a first rear cover 240, and a second rear cover 250. The pair of housing structures 210 and 220 of the electronic device 200 is not limited to the shapes and coupling shown in FIGS. 2A and 2B, and may be implemented by a combination and/or coupling of other shapes or component. In an embodiment, the first housing structure 210 and the first rear cover 240 may be integrally formed, and the second housing structure 220 and the second rear cover 250 may be integrally formed.

In an embodiment, the first housing structure 210 and the second housing structure 220 may be configured as a single housing (not shown). A foldable portion of the single housing may be made of a flexible material (not shown). The hinge structure 264 may be replaced with a flexible material, instead of being separately configured.

In an embodiment, the first housing structure 210 and the second housing structure 220 may be disposed on both sides of a folding axis (axis A). The first housing structure 210 and the second housing structure 220 may be folded or unfolded around the folding axis (axis A).

In an embodiment, the first housing structure 210 and the second housing structure 220 may have different angles or distances therebetween depending on whether the electronic device 200 is in a flat state (or open state), in a fully folded state (or closed state), or in a partially folded state (or flex state).

In an embodiment, at least a partial area of the first housing structure 210 or the second housing structure 220 may include the sensor area 231*d* where various sensors are disposed.

In an embodiment, the sensor area 231*d* may be further disposed in or replaced by at least a partial area of the second housing structure 220.

Figure 3:
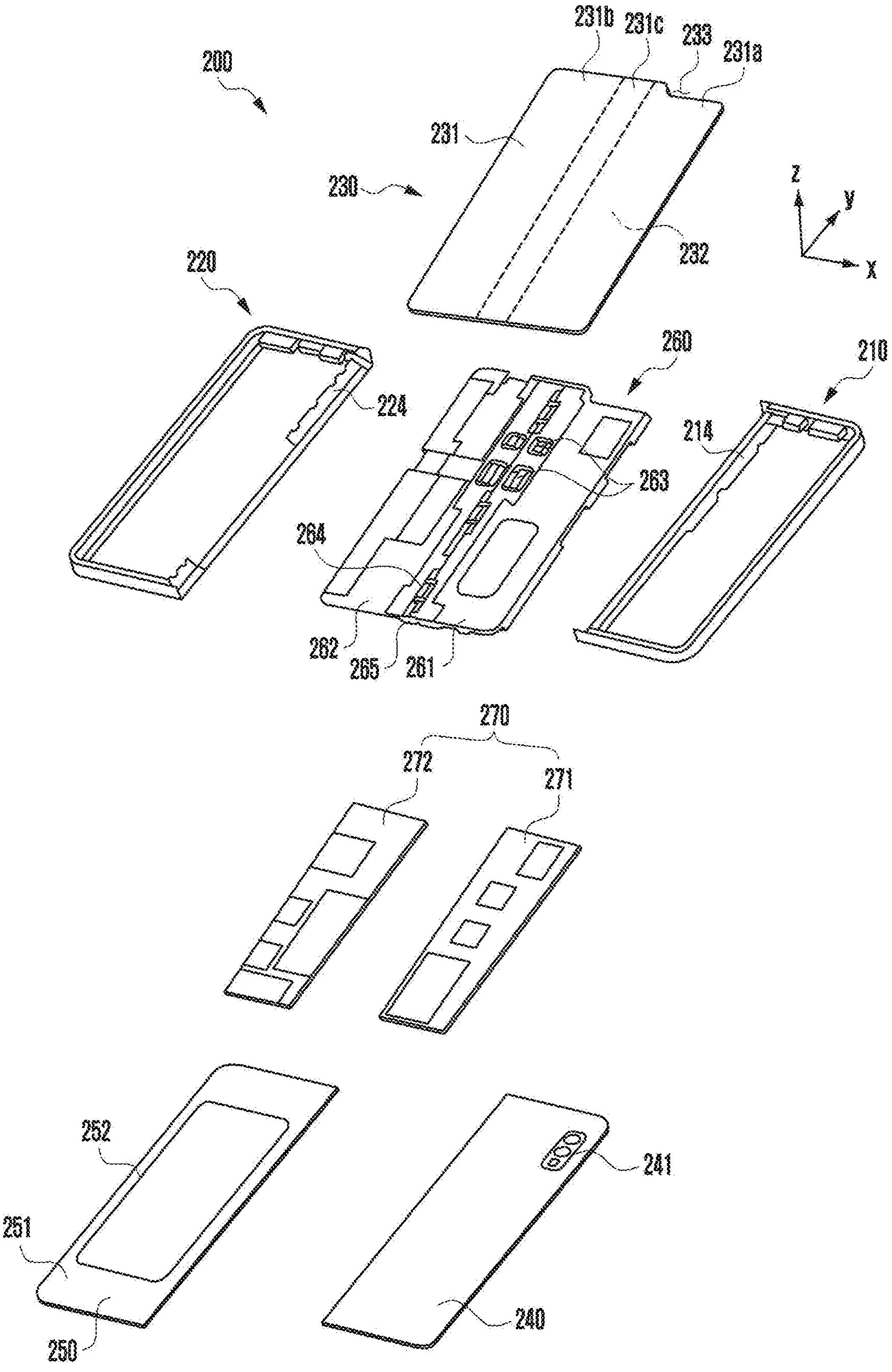
FIG. 3 is an exploded perspective view of an electronic device according to an embodiment of the disclosure.

In an embodiment, the angle formed between the first housing structure 210 and the second housing structure 220 may be adjusted based on the hinge structure (e.g., the hinge structure 264 in FIG. 3).

In an embodiment, when the first housing structure 210 and the second housing structure 220 face the same surface (e.g., the front surface), the electronic device 200 may be said to be in a flat state.

In an embodiment, when the first housing structure 210 and the second housing structure 220 are substantially parallel to the same axis (X-axis), the electronic device 200 may be said to be in a flat state.

In an embodiment, the electronic device 200 may have a flexible display (or a first display) 230 disposed in a space formed by the first housing structure 210 and the second housing structure 220.

In an embodiment, the flexible display (or the first display) 230 may include a first surface 211 and a third surface 221.

In an embodiment, a flexible area capable of being bent at a certain angle may be formed between the first surface 211 and the third surface 221.

In an embodiment, the flexible display (or the first display) 230 in which at least a partial area is bendable may have an area that is bendable in various forms in addition to the first surface 211 and the third surface 221, and the bendable area is not limited to one area.

In an embodiment, the hinge structure (e.g., the hinge structure 264 in FIG. 3) may be disposed in an area where the flexible display (or the first display) 230 is bendable.

In an embodiment, the hinge structure (e.g., the hinge structure 264 in FIG. 3) may support the flexible display (or the first display) 230 so as to remain at a certain angle while being bent when the flexible display (or the first display) 230 is bent.

In an embodiment, the first housing structure 210 may include the first surface 211 disposed to face the front, a second surface 212 facing in the opposite direction of the first surface 211, and a first side member 213 surrounding at least a portion of the space between the first surface 211 and the second surface 212.

In an embodiment, the first side member 213 may have a first side surface 213*a* disposed substantially parallel to the folding axis (axis A), a second side surface 213*b* extending in a direction substantially perpendicular to the folding axis from one end of the first side surface 213*a*, and a third side surface 213*c* extending in a direction substantially perpendicular to the folding axis (axis A) from the other end of the first side surface 213*a*.

In an embodiment, at least a portion of the second housing structure 220 may be coupled to the hinge structure (e.g., the hinge structure 264 in FIG. 3), and the second housing structure 220 may include the third surface 221 disposed to face the front of the electronic device 200, a fourth surface 222 facing in the opposite direction of the third surface 221, and a second side member 223 surrounding at least a portion of the space between the third surface 221 and the fourth surface 222.

In an embodiment, the second side member 223 may include a fourth side surface 223*a* disposed substantially parallel to the folding axis (axis A), a fifth side surface **223*b* extending in a direction perpendicular to the folding axis (axis A) from one end of the fourth side surface 223*a*, and a sixth side surface 223*c* extending in a direction substantially perpendicular to the folding axis (axis A) from the other end of the fourth side surface 223*a*. In an embodiment, the third surface 221 may face the first surface 211** in a fully folded state.

In an embodiment, the electronic device 200 may include a recess 201 formed to accommodate the flexible display (or first display) 230, which is bendable at least in part, through structural shape coupling of the first housing structure 210 and the second housing structure 220.

In an embodiment, the recess 201 may have substantially the same size as the flexible display (or first display) 230.

In an embodiment, the sensor area **231*d* may make the recess 201 have two or more different widths in a direction substantially perpendicular to the folding axis (axis A). For example, the recess 201 may have a first width W1 between a first portion 220*a* of the second housing structure 220 and a first portion 210*a* formed at the edge of the sensor area 231*d* of the first housing structure 210, and a second width W2 between a second portion 220*b* of the second housing structure 220 and a second portion 210*b* of the first housing structure 210, which does not belong to the sensor area 213*d* and is substantially parallel to the folding axis (axis A). According to various embodiments, the widths of the recess 201** may not be limited to the illustrated example.

In an embodiment, the recess 201 may have two or more different widths or have the same width.

In an embodiment, at least a portion of the first housing structure 210 and the second housing structure 220 may be made of a metal material or a non-metal material having a rigidity selected to support the flexible display (or first display) 230.

In an embodiment, the sensor area **231*d* may be formed to have a predetermined area adjacent to one corner of the first housing structure 210. However, the arrangement, shape, or size of the sensor area 231*d*** may not be limited to the illustrated example.

In an embodiment, at least one of a front camera device, a receiver, a proximity sensor, an ultrasonic sensor, a gesture sensor, a gyro sensor, a pressure sensor, a magnetic sensor, an acceleration sensor, a grip sensor, a color sensor, an infrared (IR) sensor, a biometric sensor, a temperature sensor, a humidity sensor, or an indicator may be disposed in at least partial area of the sensor area **231*d***.

In an embodiment, sensor components may be disposed inside the electronic device without a separate sensor area. For example, at least some of the components may be disposed under the flexible display (or first display) 230 or may be visible through a partial area of the flexible display (or first display) 230.

In an embodiment, the first rear cover 240 may be disposed on the second surface 212 of the first housing structure 210 and may have a substantially rectangular periphery.

In an embodiment, at least a portion of the periphery may be surrounded by the first housing structure 210.

In an embodiment, the second rear cover 250 may be disposed on the fourth surface 222 of the second housing structure 220, and at least a portion of its periphery may be surrounded by the second housing structure 220.

In an embodiment, the first rear cover 240 and the second rear cover 250 may have a substantially symmetrical shape with respect to the folding axis (axis A).

In an embodiment, the first rear cover 240 and the second rear cover 250 may include various shapes different from each other.

In an embodiment, the first rear cover 240 may be integrally formed with the first housing structure 210.

In an embodiment, the second rear cover 250 may be integrally formed with the second housing structure 220.

In an embodiment, the first rear cover 240, the second rear cover 250, the first housing structure 210, and the second housing structure 220 may be coupled to each other, thereby providing a space in which various components (e.g., a printed circuit board, an antenna module, a sensor module, or a battery) of the electronic device 200 may be disposed.

In an embodiment, one or more components may be disposed on the rear surface of the electronic device 200 or may be visible therethrough. For example, one or more components or sensors may be visible through a first rear area 241 of the first rear cover 240. In various embodiments, the sensors may include a proximity sensor, a rear camera device, and/or a flash.

In an embodiment, in the electronic device 200, at least a portion of a sub-display 252 (e.g., a second display) may be visible through a second rear area 251 of the second rear cover 250. In an embodiment, the electronic device 200 may include a speaker module 253 disposed through at least a partial area of the second rear cover 250.

The flexible display (or first display) 230 may be disposed in a space formed by the first and second housing structures 210 and 220. For example, the flexible display (or first display) 230 may be seated on a recess 201 formed by the first and second housing structures 210 and 220. The flexible display (or first display) 230 may be disposed to substantially occupy most of the front surface of the electronic device 200. The front surface of the electronic device 200 may include the flexible display (or first display) 230, and a partial area (e.g., a periphery area) of the first housing structure 210 and a partial area (e.g., a periphery area) of the second housing structure 220, which are adjacent to the flexible display (or first display) 230.

In an embodiment, the rear surface of the electronic device 200 may include the first rear cover 240, a partial area (e.g., a periphery area) of the first housing structure 210 adjacent to the first rear cover 240, the second rear cover 250, and a partial area (e.g., a periphery area) of the second housing structure 220 adjacent to the second rear cover 250.

In an embodiment, the flexible display (or first display 230) may indicate a display in which at least a partial area is able to be transformed into a flat or curved surface.

In an embodiment, the flexible display (or first display) 230 may include a folding area **231*c*, a first area 231*a* disposed on one side of the folding area 231*c* (e.g., the right area of the folding area 231*c*), and a second area 231*b* disposed on the other side thereof (e.g., the left area of the folding area 231*c*). For example, the first area 231*a* may be disposed on the first surface 211 of the first housing structure 210, and the second area 231*b* may be disposed on the third surface 221 of the second housing structure 220**.

In an embodiment, division of the area of the flexible display (or first display) 230 is illustrative, and the flexible display (or first display) 230 may be divided into a plurality of (e.g., four or more, or two) areas depending on the structure or function thereof. In the embodiment shown in FIG. 2A, the area of the flexible display (or first display) 230 may be divided by the folding area **231*c* or the folding axis (axis A) extending substantially parallel to the y-axis. In an embodiment, the flexible display (or first display) 230 may be divided into areas, based on another folding area (e.g., a folding area parallel to the x-axis) or another folding axis (e.g., a folding axis parallel to the x-axis). The division of the display area described above is only a physical division by a pair of housing structures 210 and 220 and the hinge structure (e.g., the hinge structure 264 in FIG. 3), and the flexible display (or first display) 230 may actually display one entire screen through the pair of housing structures 210 and 220 and the hinge structure (e.g., the hinge structure 264 in FIG. 3**).

In an embodiment, unlike the second area 231*b*, the first area 231*a* may include a notch area (e.g., notch area 233 in FIG. 3) obtained by cutting the area depending on the presence of the sensor area 231*d*.

In an embodiment, the first area 231*a* and the second area 231*b* may include a portion in a symmetrical shape and a portion in an asymmetrical shape to each other.

Referring to FIG. 2B, the hinge cover 265 may be disposed between the first housing structure 210 and the second housing structure 220 to cover internal components (e.g., the hinge structure 264 in FIG. 3).

In an embodiment, the hinge cover 265 may be covered by a portion of the first housing structure 210 and the second housing structure 220 or may be visible to the outside depending on the operation state (e.g., a flat state, a fully folded state, or a partially folded state) of the electronic device 200.

The operation of the first housing structure 210 and the second housing structure 220 according to the operation state (e.g., a flat state, a fully folded state, or a partially folded state) of the electronic device 200 and respective areas of the flexible display (or first display) 230 will be described as follows.

In an embodiment, when the electronic device 200 is in a fully folded state (e.g., the state in FIG. 4A), the first housing structure 210 and the second housing structure 220 may be disposed to face each other. The first area (e.g., the first area 231*a* in FIG. 2A) and the second area (e.g., the second area 231*b* in FIG. 2A) of the flexible display (or first display) 230 may form an angle of 0 degrees and may be disposed to face each other. At least a portion of the folding area (e.g., the folding area 231*c* in FIG. 2A) may be formed as a curved surface having a predetermined curvature. In an embodiment, when the electronic device 200 is in a fully folded state (e.g., the state in FIG. 4A), the first area (e.g., the first area 231*a* in FIG. 2A) and the second area (e.g., the second area 231*b* in FIG. 2A) of the flexible display (or the first display) 230 may form a certain angle (e.g., 0 degrees or more to about 10 degrees or less) and may be disposed to face each other.

In an embodiment, when the electronic device 200 is in a partially folded state (or flex state) (e.g., the state in FIG. 4B), the first housing structure 210 and the second housing structure 220 may be disposed at a certain angle (e.g., any angle greater than 0 degrees and less than about 180 degrees). The first area (e.g., the first area 231*a* in FIG. 2A) and the second area (e.g., the second area 231*b* in FIG. 2A) of the flexible display (or first display) 230 may form an angle greater than that in the fully folded state and less than that in the flat state. At least a portion of the folding area (e.g., the folding area 231*c* in FIG. 2A) may be formed as a curved surface having a predetermined curvature, and the curvature at this time may be less than that in the fully folded state.

In an embodiment, the hinge structure (e.g., the hinge structure 264 in FIG. 3) may be a free-stop hinge capable of maintaining the partially folded state of the electronic device 200.

In an embodiment, when the electronic device 200 is in the flat state (e.g., the state in FIG. 4C), the first housing structure 210 and the second housing structure 220 may form a horizontal angle (e.g., about 180 degrees) therebetween.

In an embodiment, in the flat state of the electronic device 200, the first area (e.g., the first area 231*a* in FIG. 2A) and the second area (e.g., the second area 231*b* in FIG. 2A) of the flexible display (or first display 230) may be disposed to face in substantially the same direction.

In an embodiment, when the electronic device is in the flat state, the folding area (e.g., the folding area 231*c* in FIG. 2A) may form substantially the same plane as the first area 231*a* and the second area 231*b*.

In an embodiment, when the electronic device 200 is in the flat state, the first housing structure 210 and the second housing structure 220 may rotate to be reversely folded such that the angle formed by the second housing structure 220 with respect to the first housing structure 210 becomes, for example, approximately 360 degrees so that the second surface 212 and the fourth surface 222 face each other.

FIG. 3 is an exploded perspective view of an electronic device according to an embodiment of the disclosure.

Referring to FIG. 3, in an embodiment, the electronic device 200 may include a display (e.g., flexible display (or first display) 230 of FIGS. 2A and 2B) 230, a bracket assembly 260, at least one printed circuit board 270, a first housing structure 210, a second housing structure 220, a first rear cover 240, and a second rear cover 250. In this document, the flexible display (or first display) 230 may be referred to as a display module, a display circuit, or a display assembly.

The flexible display (or first display) 230 may include a display panel 231 (e.g., a flexible display panel) and one or more plates 232 or layers on which the display panel 231 is placed.

In this document, the flexible display (or first display) 230 of FIG. 3 may be the same as the flexible display (or first display) 230 of FIGS. 2A and 2B.

In an embodiment, the plate 232 may be disposed between the display panel 231 and the bracket assembly 260. The display panel 231 may be disposed on at least a portion of one side of the plate 232 (e.g., the side directed in the Z-direction in FIG. 3). The plate 232 may be formed in a shape corresponding to the display panel 231. For example, a partial area of the region of the plate 232 may be formed in a shape corresponding to the notch area 233 of the display panel 231.

In an embodiment, the bracket assembly 260 may include a first bracket 261, a second bracket 262, a hinge structure 264, a hinge cover 265, and a wire member 263 (e.g., a flexible printed circuit board (FPCB)).

In an embodiment, the hinge structure 264 may be disposed between the first bracket 261 and the second bracket 262.

In an embodiment, the hinge cover 265 may cover the hinge structure 264 so as to be invisible from the outside.

In an embodiment, the wire member 263 (e.g., a flexible printed circuit board (FPCB)) may cross the first bracket 261 and the second bracket 262.

In an embodiment, the bracket assembly 260 may be disposed between plate 232 and at least one printed circuit board 270.

In an embodiment, the first bracket 261 may be disposed between the first area 231*a* of the flexible display (or first display) 230 and a first printed circuit board 271. The second bracket 262 may be disposed between the second area 231*b* of the flexible display (or first display) 230 and a second printed circuit board 272.

In an embodiment, at least a part of the wire member 263 and the hinge structure 264 may be disposed inside the bracket assembly 260. The wire member 263 may be disposed in a direction (e.g., the x-axis direction) cross the first bracket 261 and the second bracket 262. In an embodiment, the wire member 263 may be disposed in a direction (e.g., the x-axis direction) perpendicular to the folding axis (e.g., the y-axis or the folding axis A in FIG. 1) of the folding area 231*c*.

In an embodiment, at least one printed circuit board 270 may include a first printed circuit board 271 disposed on the side of the first bracket 261 and a second printed circuit board 272 disposed on the side of the second bracket 262.

In an embodiment, the first printed circuit board 271 and the second printed circuit board 272 may be disposed inside a space formed by the bracket assembly 260, the first housing structure 210, the second housing structure 220, the first rear cover 240, and the second rear cover 250.

In an embodiment, components for implementing various functions of the electronic device 200 may be mounted on the first printed circuit board 271 and the second printed circuit board 272.

In an embodiment, the first housing structure 210 and the second housing structure 220 may be assembled with each other so as to be coupled to both sides of the bracket assembly 260 in the state in which the flexible display (or first display) 230 is coupled to the bracket assembly 260.

In an embodiment, the first housing structure 210 and the second housing structure 220 may slide on both sides of the bracket assembly 260 to be coupled to the bracket assembly 260.

In an embodiment, the first housing structure 210 may include a first rotation-support surface 214.

In an embodiment, the second housing structure 520 may include a second rotation-support surface 224 corresponding to the first rotation-support surface 214. The first rotation-support surface 214 and the second rotation-support surface 224 may include a curved surface corresponding to the curved surface included in the hinge cover 265.

In an embodiment, when the electronic device 200 is in the flat state (e.g., the state in FIG. 2A), the first rotation-support surface 214 and the second rotation-support surface 224 may cover the hinge cover 265 such that the hinge cover 265 is not exposed through the rear surface of the electronic device 200 or is minimally exposed.

In an embodiment, when the electronic device 200 is in the fully folded state (e.g., the state in FIGS. 2B and 4A), the first rotation-support surface 214 and the second rotation-support surface 224 may rotate along the curved surface included in the hinge cover 265 so that the hinge cover 265 may be maximally exposed through the rear surface of the electronic device 200.

In an embodiment, the sub-display (or second display) 252 may be mounted on the second rear cover 250 so as to be exposed to the outside through the rear surface of the electronic device 200.

Figure 4A:
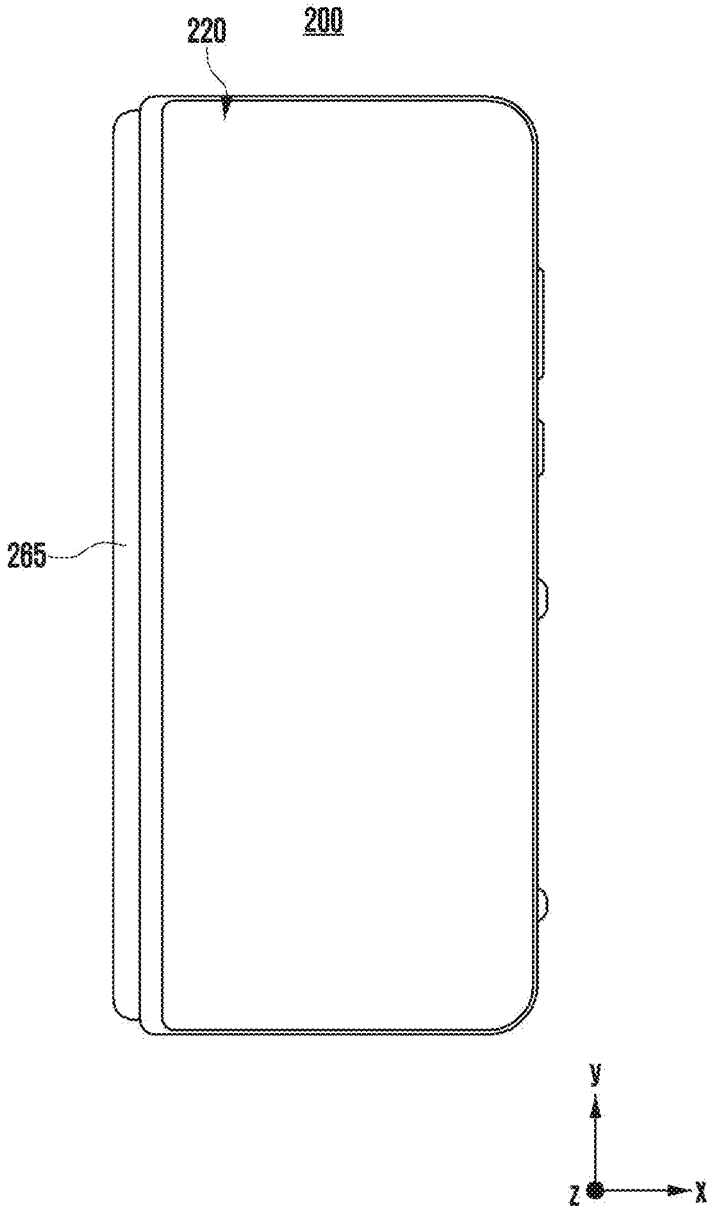
FIG. 4A is a diagram illustrating a front face of an electronic device in a fully folded state (or closed state) according to an embodiment of the disclosure.

FIG. 4A is a diagram illustrating a front face of an electronic device in a fully folded state (or closed state) according to an embodiment of the disclosure.

Figure 4B:
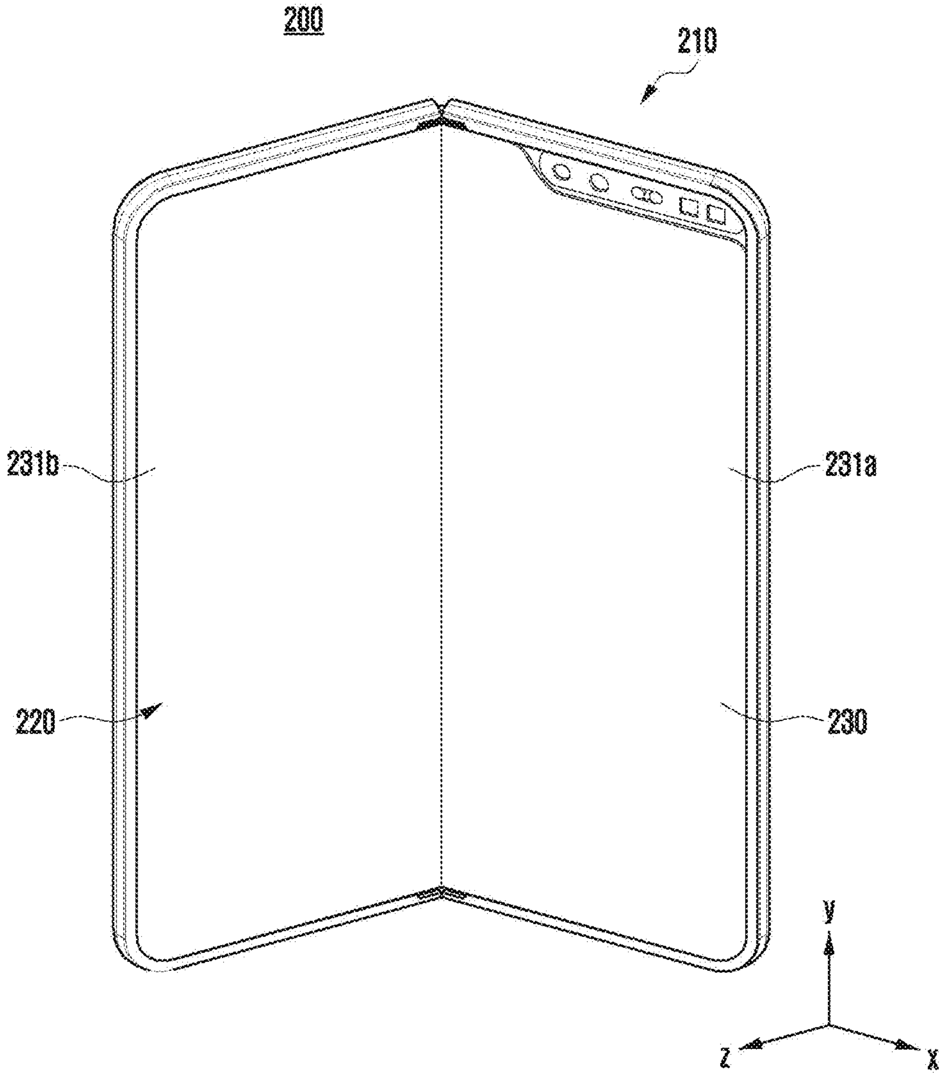
FIG. 4B is a diagram illustrating a front face of an electronic device in a partially folded state according to an embodiment of the disclosure.

FIG. 4B is a diagram illustrating a front face of an electronic device in a partially folded state according to an embodiment of the disclosure.

Figure 4C:
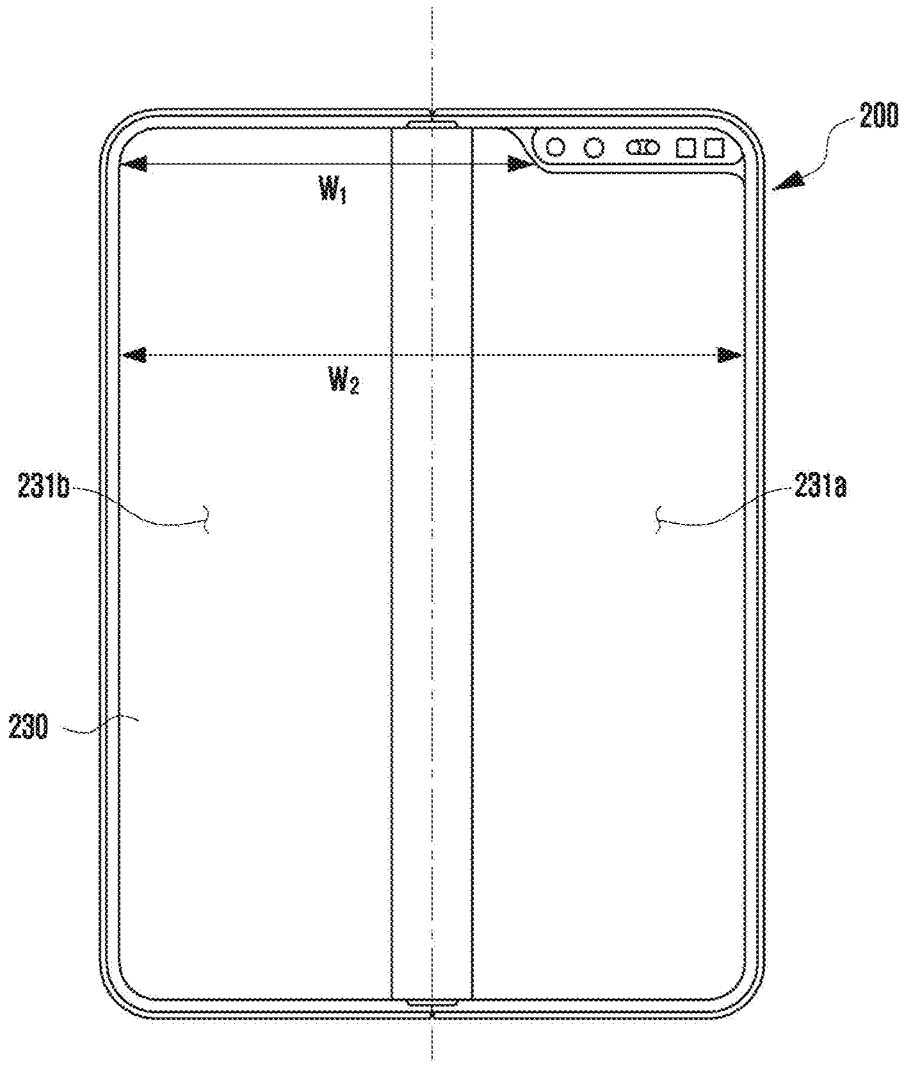
FIG. 4C is a diagram illustrating a front face of an electronic device in a flat state (or an open state) according to an embodiment of the disclosure.

FIG. 4C is a diagram illustrating a front face of an electronic device in a flat state (or an open state) according to an embodiment of the disclosure.

Figure 5A:
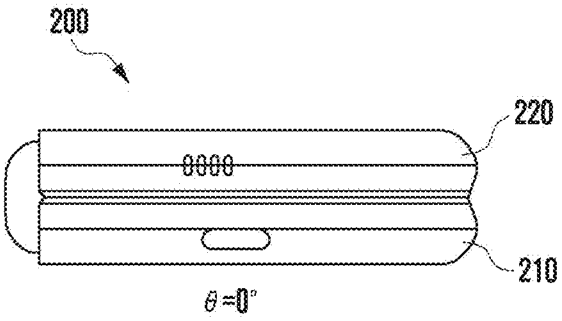
FIG. 5A is a diagram illustrating a side face of an electronic device in a fully folded state (or closed state) according to an embodiment of the disclosure.

FIG. 5A is a diagram illustrating a side face of an electronic device in a fully folded state (or closed state) according to an embodiment of the disclosure.

Figure 5B:
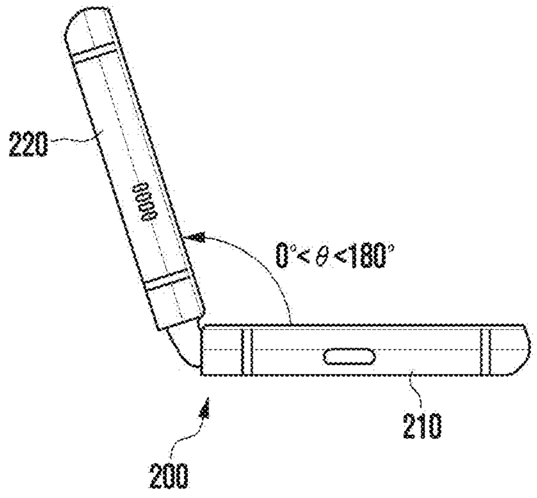
FIG. 5B is a diagram illustrating a side face of an electronic device in a partially folded state according to an embodiment of the disclosure.

FIG. 5B is a diagram illustrating a side face of an electronic device in a partially folded state according to an embodiment of the disclosure.

Figure 5C:
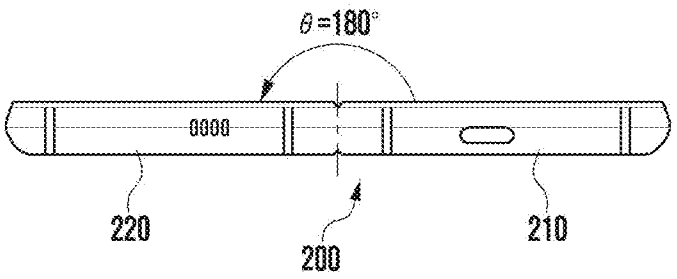
FIG. 5C is diagram illustrating a side face of an electronic device in a flat state (or open state) according to an embodiment of the disclosure.

FIG. 5C is diagram illustrating a side face of an electronic device in a flat state (or open state) according to an embodiment of the disclosure.

Referring to FIGS. 4A and 5A, when the electronic device 200 is in the fully folded state, the first housing structure 210 and the second housing structure 220 may be disposed to face each other. The first area (e.g., the first area 231*a* in FIG. 2A) and the second area (e.g., the second area 231*b* in FIG. 2A) of the flexible display (or first display) 230 may form an angle of 0 degrees and may be disposed to face each other. At least a portion of the folding area (e.g., the folding area 231*c* in FIG. 2A) may be formed as a curved surface having a predetermined curvature.

In an embodiment, when the electronic device 200 is in the fully folded state, the first area (e.g., the first area 231*a* in FIG. 2A) and the second area (e.g., the second area 231*b* in FIG. 2A) of the flexible display (or first display) 230 may form a certain angle (e.g., 0 degrees or more to about 10 degrees or less) and may be disposed to face each other. In an embodiment, when the electronic device 200 is in the fully folded state, the flexible display (or first display) 230 may not be exposed to the outside.

In an embodiment, the fully folded state of the electronic device 200 may be the same as a closed state of the electronic device 200.

Referring to FIGS. 4B and 5B, when the electronic device 200 is in the partially folded state, the first housing structure 210 and the second housing structure 220 may be disposed at a certain angle (e.g., any angle greater than 0 degrees and less than about 180 degrees).

In an embodiment, the first area (e.g., the first area 231*a* in FIG. 2A) and the second area (e.g., the second area 231*b* in FIG. 2A) of the flexible display (or first display) 230 may form an angle greater than that in the fully folded state and less than that in the flat state. At least a portion of the folding area (e.g., the folding area 231*c* in FIG. 2A) may be formed as a curved surface having a predetermined curvature, and the curvature at this time may be less than that in the fully folded state.

In an embodiment, the hinge structure (e.g., the hinge structure 264 in FIG. 3) may be a free-stop hinge capable of maintaining the partially folded state of the electronic device 200.

In an embodiment, when the electronic device 200 is in the partially folded state, the first area (e.g., the first area 231*a* in FIG. 2A) and the second area (e.g., the second area 231*b* in FIG. 2A) of the flexible display (or first display) 230 may be exposed to the outside at a certain angle (e.g., any angle greater than 0 degrees and less than about 180 degrees).

Referring to FIGS. 4C and 5C, when the electronic device 200 is in the flat state (e.g., the state in FIG. 4C), the first housing structure 210 and the second housing structure 220 may form a horizontal angle (e.g., about 180 degrees) therebetween.

In an embodiment, in the flat state of the electronic device 200, the first area (e.g., the first area 231*a* in FIG. 2A) and the second area (e.g., the second area 231*b* in FIG. 2A) of the flexible display (or first display) 230 may be disposed to face in substantially the same direction.

In an embodiment, when the electronic device 200 is in the flat state, the folding area (e.g., the folding area 231*c* in FIG. 2A) may form substantially the same plane as the first area 231*a* and the second area 231*b*.

Figure 6:
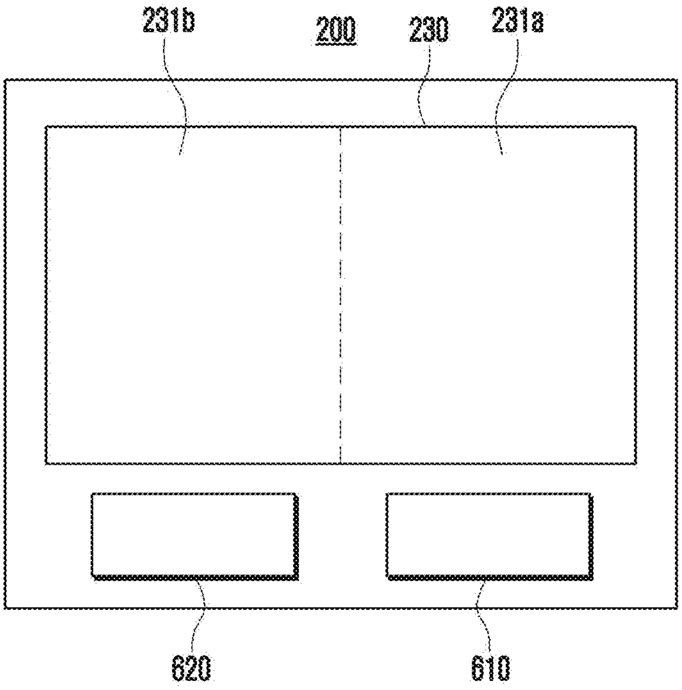
FIG. 6 is a block diagram illustrating a configuration for a control operation of a flexible display according to an embodiment of the disclosure.

FIG. 6 is a block diagram illustrating a configuration for a control operation of a flexible display according to an embodiment of the disclosure.

Referring to FIG. 6, the electronic device 200 may include a flexible display 230, a first display driving circuit 610, and/or a second display driving circuit 620. In an embodiment, although the electronic device 200 includes a plurality of display driving circuits such as the first display driving circuit 610 and the second display driving circuit 620, it is not limited thereto.

In an embodiment, the electronic device 200 may include a single display driving circuit in which the first display driving circuit 610 and the second display driving circuit 620 are integrated.

According to various embodiments, the first display driving circuit 610 may include an interface module (not shown), a memory (e.g., a buffer memory) (not shown), an image processing module (not shown), or a mapping module (not shown). The first display driving circuit 610 may receive image information including, for example, image data or an image control signal corresponding to a command for controlling the image data from another element of the electronic device 200 through an interface module.

For example, the first display driving circuit 610 may receive image information from a processor (e.g., the processor 120 in FIG. 1) or receive the same from a co-processor (e.g., a graphic processing device) that is operated independently of the function of the processor 120.

In an embodiment, the first display driving circuit 610 may communicate with a touch circuit or a sensor module through an interface module.

In an embodiment, the first display driving circuit 610 may control the memory to store at least some of the image information received from another element (e.g., the processor 120) of the electronic device. For example, the first display driving circuit 610 may store, in the memory, the received image information in units of frame.

In an embodiment, the image processing module may perform pre-processing or post-processing (e.g., adjusting resolution, brightness, or size) on at least some of image data, based at least on the properties of the image data or the properties of the first area 231*a*.

In an embodiment, the mapping module may generate a voltage value or current value corresponding to image data pre-processed or post-processed by the image processing module.

In an embodiment, the generation of the voltage value or current value may be performed based on at least some of the properties of pixels (e.g., the array of pixels (red, green, blue (RGB) stripe or pentile structure) or the size of each sub-pixel) of the first area 231*a*. At least some pixels of the first area 231*a* may be driven based on, for example, at least some of the voltage value or the current value. Visual information (e.g., text, images, or icons) corresponding to the image data may be displayed through the first area 231*a*.

In an embodiment, the second display driving circuit 620 may drive the second area 231*b* to display an image based on image information received from the processor 120.

In an embodiment, the second display driving circuit 620 may include the same or similar elements as the first display driving circuit 610 and differ only in driving the second area 231*b*. For example, the second display driving circuit 620 may include an interface module (not shown), a memory (e.g., a buffer memory) (not shown), an image processing module (not shown), or a mapping module (not shown), which perform functions similar to those of the first display driving circuit 610.

In an embodiment, the folding area 231*c* may be driven by the first display driving circuit 610 and/or the second display driving circuit 620.

In an embodiment, the electronic device 200 may drive the folding area 231*c*, based on the first display driving circuit 610 and/or the second display driving circuit 620.

In an embodiment, the electronic device 200 may further include an additional display driving circuit (not shown), as well as the first display driving circuit 610 and the second display driving circuit 620. The electronic device 200 may drive the folding area 231*c*, based on the additional display driving circuit (not shown).

In an embodiment, the processor 120 may include a first display port (not shown) operatively connected to the first display driving circuit 610 and a second display port (not shown) operatively connected to the second display driving circuit 620. For example, the processor 120 may transmit first image information to the first display driving circuit 610 through the first display port (not shown) and transmit second image information to the second display driving circuit 620 through the second display port (not shown).

In an embodiment, the first image information and the second image information may be the same. For example, the processor 120 may transmit image information including the same image data to the first display driving circuit 610 and the second display driving circuit 620.

In an embodiment, the image data included in the second image information may include at least some of the image data included in the first image information. For example, the processor 120 may receive an input for selecting some of first image data (e.g., the entire image displayed on the first area 231*a*) from a user and, based on the input, transmit second image data (e.g., some of the entire image displayed in the second area 231*b*), which is part of the first image data, to the second display driving circuit 620.

In an embodiment, the processor 120 may transmit the same image data to the first display driving circuit 610 and the second display driving circuit 620, and further transmit coordinate information based on the user input to the second display driving circuit 620. For example, the coordinate information may be coordinate information (e.g., coordinates of the second image data) defining some of the first image data selected by the user, and the second display driving circuit 620, based on the coordinate information, may drive the display to display some (e.g., the second image data) of the first image data.

In an embodiment, power of the first area 231*a* and the second area 231*b* may be controlled to be substantially the same by the processor 120. For example, under the control of the processor 120, the electronic device 200 may supply power to the first display driving circuit 610 and the second display driving circuit 620 using driving circuit input power.

In an embodiment, the electronic device 200, under the control of the processor 120, may supply power to the first area 231*a* and the second area 231*b* through display input powers.

In an embodiment, the driving circuit input power may be power supplied from the power management module 188 or the battery 189 to the first display driving circuit 610 and/or the second display driving circuit 620. The electronic device 200 may supply power to each of the first display driving circuit 610 and/or the second display driving circuit 620 using driving circuit input power corresponding to each of the first display driving circuit 610 and/or the second display driving circuit 620. The power may be supplied to the first display driving circuit 610 using first driving circuit input power. The power may be supplied to the second display driving circuit 620 using second driving circuit input power.

In an embodiment, the display input power may be the power supplied from the power management module 188 or the battery 189 to the first area 231*a* and/or the second area 231*b* of the flexible display 230. The electronic device 200 may supply power to each of the first area 231*a* and/or the second area 231*b* using display input power corresponding to each of the first area 231*a* and/or the second area 231*b*.

In an embodiment, the electronic device 200 may supply power to the first area 231*a* and the second area 231*b* through the first display driving circuit 610 and/or the second display driving circuit 620, as well as the power management module 188 or the battery 189.

For example, in the case where the power of the first area 231*a* and the second area 231*b* is controlled substantially equally by the processor 120, the first area 231*a* and the second area 231*b* may be supplied with the display input power.

In an embodiment, in the case where the power of the first area 231*a* and the second area 231*b* is controlled differently by the processor 120, any one (e.g., the first area 231*a*) of the first area 231*a* and the second area 231*b* may be supplied with the display input power supplied from the power management module 188 or the battery 189, and the other (e.g., the second area 231*b*) thereof may operate based on control power output from the display driving circuit (e.g., the second display driving circuit 620), instead of being supplied with the display input power. The display driving circuit may generate the control power, based on the driving circuit input power supplied from the power management module 188 or the battery 189.

In an embodiment, in the case where the power of the first area 231*a* and the second area 231*b* is controlled differently by the processor 120, the first area 231*a* may be supplied with the display input power supplied from the power management module 188 or the battery 189, and the second area 231*b* may operate based on control power output from the second display driving circuit 620, instead of being supplied with the display input power.

In an embodiment, in the case where the power of the first area 231*a* and the second area 231*b* is controlled differently by the processor 120, the second area 231*b* may be supplied with the display input power supplied from the power management module 188 or the battery 189, and the first area 231*a* may operate based on control power output from the first display driving circuit 610, instead of being supplied with the display input power.

In an embodiment, in the case where the power of the first area 231*a* and the second area 231*b* is controlled substantially equally by the processor 120, each of the first area 231*a* and the second area 231*b* may receive the display input power, and each of the first display driving circuit 610 and the second display driving circuit 620 may receive the driving circuit input power.

In an embodiment, in the case where the power of the first area 231*a* and the second area 231*b* is controlled substantially equally by the processor 120, the first area 231*a* and the second area 231*b* may have the same display configuration (e.g., resolution, luminance, gamma properties, color representation, refresh rate, or white scale), which may affect the display consumption power.

In an embodiment, in the case where the power of the first area 231*a* and the second area 231*b* is controlled substantially equally by the processor 120, the electronic device 200 may control the first display driving circuit 610 and the second display driving circuit 620 through the processor 120 such that the first area 231*a* and the second area 231*b* have the same display configuration (e.g., resolution, luminance, gamma properties, color representation, refresh rate, or white scale).

In an embodiment, in the case where the power of the first area 231*a* and the second area 231*b* is controlled substantially equally by the processor 120, the electronic device 200 may simultaneously control the first display driving circuit 610 and the second display driving circuit 620 such that the first area 231*a* and the second area 231*b* have the same display configuration (e.g., resolution, luminance, gamma properties, color representation, refresh rate, or white scale).

In an embodiment, in the case where the power of the first area 231*a* and the second area 231*b* is controlled substantially equally by the processor 120, the electronic device 200 may control the first display driving circuit 610 and the second display driving circuit 620, respectively, such that the first area 231*a* and the second area 231*b* have the same display configuration (e.g., resolution, luminance, gamma properties, color representation, refresh rate, or white scale).

In an embodiment, the power of the first area 231*a* and the second area 231*b* may be controlled differently by the processor 120.

In an embodiment, in the case where the power of the first area 231*a* and the second area 231*b* is controlled differently by the processor 120, the first area 231*a* may be controlled to operate with predetermined power or with power higher than the predetermined power, and the second area 231*b* may be controlled to operate with power lower than the predetermined power. However, the disclosure is not limited thereto, and in the case where the power of the first area 231*a* and the second area 231*b* is controlled differently by the processor 120, the second area 231*b* may be controlled to operate with predetermined power or with power higher than the predetermined power, and the first area 231*a* may be controlled to operate with power lower than the predetermined power.

In an embodiment, in the case where the power of the first area 231*a* and the second area 231*b* is controlled differently by the processor 120, one of the first area 231*a* and the second area 231*b* may be supplied with the display input power, and the other thereof may be supplied through the display driving circuit (e.g., the first display driving circuit 610 and the second display driving circuit 620).

In an embodiment, in the case where the power of the first area 231*a* and the second area 231*b* is controlled differently by the processor 120, the first area 231*a* may be supplied with the display input power supplied from the power management module 188 or the battery 189, and the second area 231*b* may operate based on control power output from the second display driving circuit 620, instead of being supplied with the display input power.

In an embodiment, in the case where the power of the first area 231*a* and the second area 231*b* is controlled differently by the processor 120, the second area 231*b* may be supplied with the display input power supplied from the power management module 188 or the battery 189, and the first area 231*a* may operate based on control power output from the first display driving circuit 610, instead of being supplied with the display input power.

For example, in the case where the power of the first area 231*a* and the second area 231*b* is controlled differently by the processor 120, the first area 231*a* may be supplied with the display input power, and the second area 232*a* may be supplied with power through the second display driving circuit 620. However, the disclosure is not limited thereto, in the case where the power of the first area 231*a* and the second area 231*b* is controlled differently by the processor 120, the first area 231*a* may be supplied with power through the first display driving circuit 610, and the second area 232*a* may be supplied with the display input power.

In an embodiment, in the case where the power of the first area 231*a* and the second area 231*b* is controlled differently by the processor 120, the display configuration (e.g., resolution, luminance, gamma properties, color representation, refresh rate, or white scale), which may affect display consumption power, may be different from each other.

For example, in the case where the power of the first area 231*a* and the second area 231*b* is controlled differently by the processor 120, the first area 231*a* may operate with a predetermined resolution (e.g., full high definition (FHD)) or a resolution higher than the predetermined resolution, and the second area 231*b* may operate with a resolution lower than the predetermined resolution. However, the disclosure is not limited thereto, in the case where the power of the first area 231*a* and the second area 231*b* is controlled differently by the processor 120, the second area 231*b* may operate with a predetermined resolution (e.g., FHD) or a resolution higher than the predetermined resolution, and the first area 231*a* may operate with a resolution lower than the predetermined resolution.

For example, in the case where the power of the first area 231*a* and the second area 231*b* is controlled differently by the processor 120, the first area 231*a* may operate with predetermined luminance or luminance higher than the predetermined luminance, and the second area 231*b* may operate with luminance lower than the predetermined luminance. However, the disclosure is not limited thereto, in the case where the power of the first area 231*a* and the second area 231*b* is controlled differently by the processor 120, the second area 231*b* may operate with predetermined luminance or luminance higher than the predetermined luminance, and the first area 231*a* may operate with luminance lower than the predetermined luminance.

For example, in the case where the power of the first area 231*a* and the second area 231*b* is controlled differently by the processor 120, the first area 231*a* may operate with predetermined gamma properties or gamma properties higher than the predetermined gamma properties, and the second area 231*b* may operate with gamma properties lower than the predetermined gamma properties. However, the disclosure is not limited thereto, in the case where the power of the first area 231*a* and the second area 231*b* is controlled differently by the processor 120, the second area 231*b* may operate with predetermined gamma properties or gamma properties higher than the predetermined gamma properties, and the first area 231*a* may operate with gamma properties lower than the predetermined gamma properties.

For example, in the case where the power of the first area 231*a* and the second area 231*b* is controlled differently by the processor 120, the first area 231*a* may operate with predetermined color representation or color representation higher than the predetermined color representation, and the second area 231*b* may operate with color representation lower than the predetermined color representation. However, the disclosure is not limited thereto, in the case where the power of the first area 231*a* and the second area 231*b* is controlled differently by the processor 120, the second area 231*b* may operate with predetermined color representation or color representation higher than the predetermined color representation, and the first area 231*a* may operate with color representation lower than the predetermined color representation.

For example, in the case where the power of the first area 231*a* and the second area 231*b* is controlled differently by the processor 120, the first area 231*a* may operate with a predetermined white scale or a white scale higher than the predetermined white scale, and the second area 231*b* may operate with a white scale lower than the predetermined white scale. However, the disclosure is not limited thereto, in the case where the power of the first area 231*a* and the second area 231*b* is controlled differently by the processor 120, the second area 231*b* may operate with a predetermined white scale or a white scale higher than the predetermined white scale, and the first area 231*a* may operate with a white scale lower than the predetermined white scale.

For example, in the case where the power of the first area 231*a* and the second area 231*b* is controlled differently by the processor 120, the first area 231*a* may operate with a predetermined refresh rate or a refresh rate higher than the predetermined refresh rate, and the second area 231*b* may operate with a refresh rate lower than the predetermined refresh rate. However, the disclosure is not limited thereto, in the case where the power of the first area 231*a* and the second area 231*b* is controlled differently by the processor 120, the second area 231*b* may operate with a predetermined refresh rate or a refresh rate higher than the predetermined refresh rate, and the first area 231*a* may operate with a refresh rate lower than the predetermined refresh rate.

In an embodiment, in the case where the power of the first area 231*a* and the second area 231*b* is controlled differently by the processor 120, the electronic device 200 may control the first display driving circuit 610 and the second display driving circuit 620 through the processor 120 such that the display configuration (e.g., resolution, luminance, gamma properties, color representation, refresh rate, or white scale) differs between the first area 231*a* and the second area 231*b*.

In an embodiment, in the case where the power of the first area 231*a* and the second area 231*b* is controlled differently by the processor 120, the electronic device 200 may simultaneously control the first display driving circuit 610 and the second display driving circuit 620 such that the display configuration (e.g., resolution, luminance, gamma properties, color representation, refresh rate, or white scale) differs between the first area 231*a* and the second area 231*b*.

In an embodiment, in the case where the power of the first area 231*a* and the second area 231*b* is controlled differently by the processor 120, the electronic device 200 may control the first display driving circuit 610 and the second display driving circuit 620, respectively, such that the display configuration (e.g., resolution, luminance, gamma properties, color representation, refresh rate, or white scale) differs between the first area 231*a* and the second area 231*b*.

Figure 7:
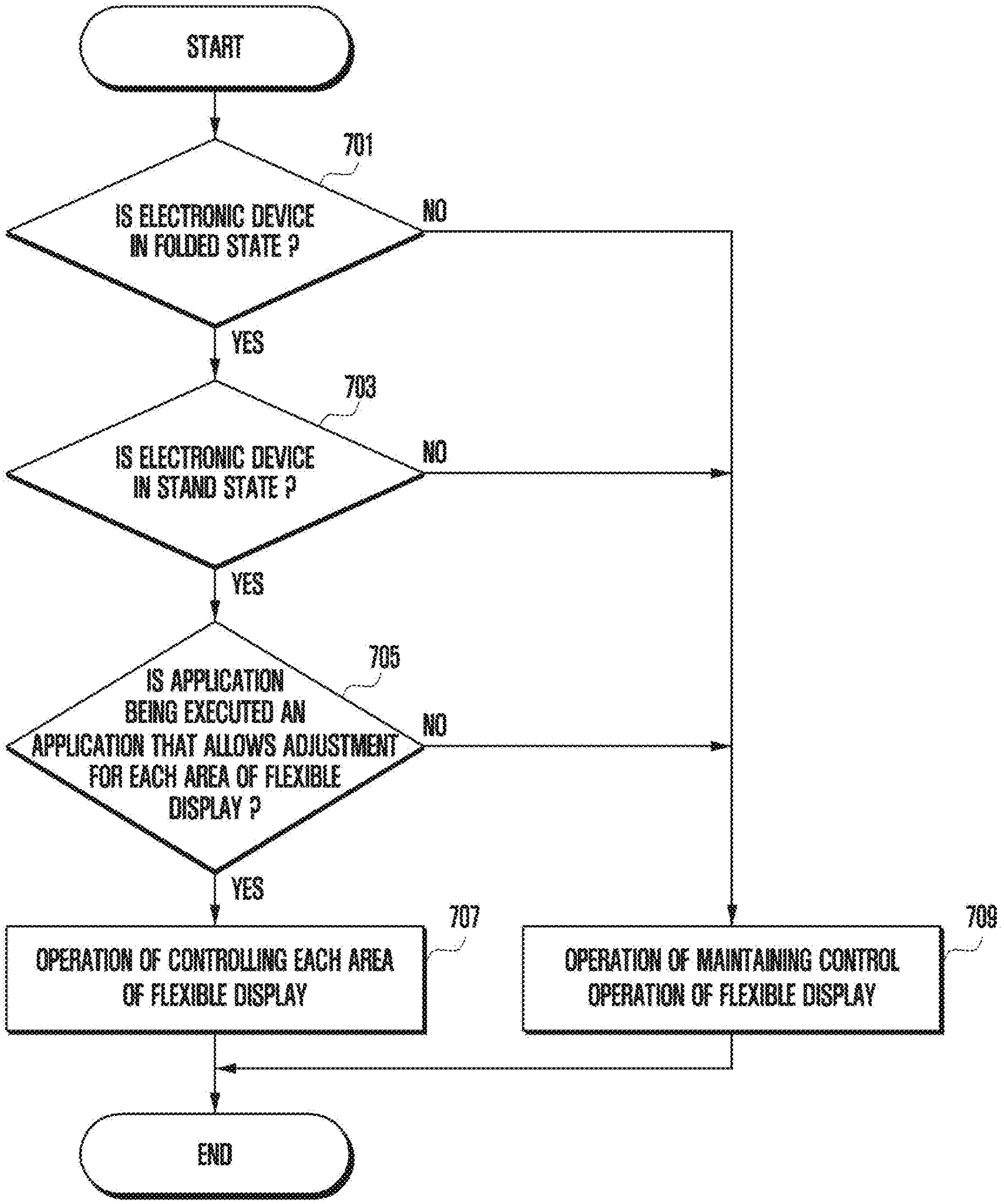
FIG. 7 is a flowchart illustrating a method of controlling a display of an electronic device according to an embodiment of the disclosure.

FIG. 7 is a flowchart illustrating a method of controlling a display of an electronic device according to an embodiment of the disclosure.

In an embodiment, the electronic device 200, under the control of the processor 120, may determine whether or not the electronic device 200 is in a partially folded state, in operation 701.

In an embodiment, the electronic device 200 may include a first housing structure 210, a second housing structure 220, and a hinge structure 264. The electronic device 200 may rotate the first housing structure 210 and the second housing structure 220, based on the hinge structure 264, to a folded or flat state.

In an embodiment, the flexible display 230 may be disposed in the first housing structure 210 and the second housing structure 220 so as to divide the display area. For example, the flexible display 230 may include a first area 231*a* disposed on a first surface 211 of the first housing structure 210 and a second area 231*b* disposed on a third surface 221 of the second housing structure 220.

In an embodiment, the electronic device 200, under the control of the processor 120, may determine the state (e.g., a fully folded state, a partially folded state, or a flat state) of the electronic device 200 using sensors that detect the rotational motion of the hinge structure 264. For example, the sensors (e.g., the sensor module 176 in FIG. 1) may include a proximity sensor, a gyro sensor, and/or a Hall sensor. In an embodiment, the electronic device 200 may determine the state of the electronic device 200, based on information (e.g., angle or distance) obtained using the sensors.

In an embodiment, the electronic device 200, under the control of the processor 120, may detect a change in the curvature of the folding area 231*c* of the flexible display 230, thereby determining the state (e.g., a fully folded state, a partially folded state, or a flat state) of the electronic device 200.

In an embodiment, if the first housing structure 210 and the second housing structure 220 are disposed to face each other, the electronic device 200, under the control of the processor 120, may determine that the electronic device 200 is in a fully folded state (or closed state).

In an embodiment, if the first area 231*a* and the second area 231*b* of the flexible display 230 form an angle of 0 degrees and are disposed to face each other, the electronic device 200, under the control of the processor 120, may determine that the electronic device 200 is in the fully folded state (or closed state).

In an embodiment, if the first area 231*a* and the second area 231*b* of the flexible display 230 form a certain angle (e.g., 0 degrees or more to about 10 degrees or less) and are disposed to face each other, the electronic device 200, under the control of the processor 120, may determine that the electronic device 200 is in the fully folded state (or closed state).

In an embodiment, if the first housing structure 210 and the second housing structure 220 are disposed at a certain angle (e.g., any angle greater than 0 degrees and less than about 180 degrees), the electronic device 200, under the control of the processor 120, may determine that the electronic device 200 is in a partially folded state.

In an embodiment, if the first area 231*a* and the second area 231*b* of the flexible display 230 form an angle greater than that in the fully folded state and less than that in the flat state, the electronic device 200, under the control of the processor 120, may determine that the electronic device 200 is in the partially folded state.

In an embodiment, if the first housing structure 210 and the second housing structure 220 form a horizontal angle (e.g., approximately 180 degrees), the electronic device 200, under the control of the processor 120, may determine that the electronic device 200 is in a flat state.

In an embodiment, if the first area 231*a* and the second area 231*b* of the flexible display 230 are disposed to face in substantially the same direction, the electronic device 200, under the control of the processor 120, may determine that the electronic device 200 is in the flat state.

In an embodiment, if the folding area (e.g., the folding area 231*c* in FIG. 2A) forms substantially the same plane as the first area 231*a* and the second area 231*b*, the electronic device 200, under the control of the processor 120, may determine that the electronic device 200 is in the flat state.

In an embodiment, the electronic device 200, under the control of the processor 120, may display a first execution screen, corresponding to a first application, on the first area 231*a* and the second area 231*b* of the flexible display 230 while the electronic device 200 (or the housings 210, 220) is in the flat state, in operation 701.

In an embodiment, the electronic device 200, under the control of the processor 120, may identify the electronic device 200 (or the housings 210, 220) being moved from flat state to the partially folded state while the first execution screen, corresponding to the first application, is displayed on the first area and the second area of the flexible display, in operation 701.

In an embodiment, if it is determined that the electronic device 200 is in the partially folded state, the electronic device 200, under the control of the processor 120, may proceed to operation 703 from operation 701.

In an embodiment, if it is determined that the electronic device 200 is not in the partially folded state, the electronic device 200, under the control of the processor 120, may proceed to operation 709 from operation 701. If it is determined that the electronic device 200 is in the fully folded state, the electronic device 200, under the control of the processor 120, may proceed to operation 709 from operation 701. If it is determined that the electronic device 200 is in the flat state, the electronic device 200, under the control of the processor 120, may proceed to operation 709 from operation 701.

In an embodiment, the electronic device 200, under the control of the processor 120, may determine whether or not the electronic device 200 is in a stand state, in operation 703.

In an embodiment, the electronic device 200, under the control of the processor 120, may display a second execution screen corresponding to the first application, different from the first execution screen, on the first area (231*a*) and the second area (231*b*) of the flexible display (230) based at least on the housings (210, 220) being moved from the flat state to the partially folded state, in operation 703.

In an embodiment, the stand state of the electronic device 200 may indicate a state in which the rear surface (e.g., the second surface 212 in FIG. 2A) of the first housing structure 210 or the rear surface (e.g., the fourth surface 222 in FIG. 2A) of the second housing structure 220 face the ground when the electronic device 200 is in the partially folded state.

In an embodiment, the stand state of the electronic device 200 may indicate a state in which one of the first area 231*a* and the second area 231*b* of the flexible display 230 is more closely aligned with a ground plane in the partially folded state.

In an embodiment, the stand state of the electronic device 200 may indicate a state in which one of the first area 231*a* and the second area 231*b* of the flexible display 230 is aligned parallel to the ground plane in the partially folded state.

For example, the stand state of the electronic device 200 may be a state in which the rear surface (e.g., the second surface 212 in FIG. 2A) of the first housing structure 210 faces the ground and in which the second housing structure 220 stands in the air based on the first housing structure 210 when the electronic device 200 is in the partially folded state. However, the disclosure is not limited thereto, the stand state of the electronic device 200 may be a state in which the rear surface (e.g., the fourth surface 222 in FIG. 2A) of the second housing structure 220 faces the ground and in which the first housing structure 210 stands in the air based on the second housing structure 220 when the electronic device 200 is in the partially folded state.

In an embodiment, the stand state of the electronic device 200 may be determined based on a signal detected by a gyro sensor or an acceleration sensor. For example, if a signal detected by the gyro sensor and/or the acceleration sensor is determined to indicate that the axial movement angle of any one of the rear surface of the first housing structure 210 and the rear surface of the second housing structure 220 is within a predetermined angle or is determined to be a stopped signal, the electronic device 200 may determine that any one of the rear surface of the first housing structure 210 and the rear surface of the second housing structure 220 faces the ground.

In an embodiment, the stand state of the electronic device 200 may indicate a state in which the rear surface of any one of the first housing structure 210 or the second housing structure 220 is placed on the ground. In an embodiment, the stand state of the electronic device 200 may indicate a state in which the rear surface of any one of the first housing structure 210 and the second housing structure 220 faces the ground.

In an embodiment, if it is determined that the electronic device 200 is in the stand state, the electronic device 200, under the control of the processor 120, may proceed to operation 705 from operation 703.

In an embodiment, if it is determined that the electronic device 200 is not in the stand state, the electronic device 200, under the control of the processor 120, may proceed to operation 709 from operation 703.

In an embodiment, the electronic device 200, under the control of the processor 120, may determine whether or not the application being executed in the electronic device 200 is an application that allows adjustment for each area of the flexible display 230, in operation 705.

In an embodiment, operation 705 can be omitted. The electronic device 200, under the control of the processor 120, may proceed to operation 707 from operation 703 without operation 705.

The application that allows adjustment for each area of the flexible display 230 may be, for example, a media application or a note application.

The application that allows adjustment for each area of the flexible display 230 may be an application including a controller interface and an output interface. For example, the controller interface may be a virtual keypad, a media controller (e.g., play, pause, stop, and progress bar), or a handwriting input interface (e.g., pen, eraser, and line colors). The output interface may be a document output interface, a handwriting output interface, a video output interface, or a music output interface.

In an embodiment, if it is determined that the application being executed in the electronic device 200 is the application that allows adjustment for each area of the flexible display 230, the electronic device 200, under the control of the processor 120, may proceed to operation 707 from operation 705.

In an embodiment, if it is determined that the application being executed in the electronic device 200 is not the application that allows adjustment for each area of the flexible display 230, the electronic device 200, under the control of the processor 120, may proceed to operation 709 from operation 705.

In an embodiment, the electronic device 200, under the control of the processor 120, may control each area of the flexible display 230, in operation 707.

In an embodiment, the electronic device 200, under the control of the processor 120, may control power for each area of the flexible display 230, in operation 707.

In an embodiment, the electronic device 200, under the control of the processor 120, may control the first display driving circuit 610 and the second driving circuit 620 such that one of the first area 231*a* and the second area 231*b* of the flexible display 230, which is more closely aligned with a ground plane, consumes electrical power less than electrical power consumed by the other one of the first area 231*a* and the second area 231*b* of the flexible display 230 while the second execution screen is displayed in the partially folded state.

In an embodiment, when starting to control each area of the flexible display 230 in operation 707, the electronic device 200, under the control of the processor 120, may control each area of the flexible display 230 after a delay of a predetermined time.

In an embodiment, when starting power control for each area of the flexible display 230 in operation 707, the electronic device 200, under the control of the processor 120, may control power for each area of the flexible display 230 after a delay of a predetermined time. For example, the predetermined time may vary (e.g., 30 seconds or 1 minute), which may be configured by a user.

In an embodiment, the electronic device 200, under the control of the processor 120, may control each area of the flexible display 230, in operation 707.

In an embodiment, the electronic device 200, under the control of the processor 120, may control power for each area of the flexible display 230, in operation 707.

In an embodiment, the electronic device 200, under the control of the processor 120, may control the first area 231*a* and the second area 231*b* of the flexible display 230, respectively, in operation 707.

In an embodiment, the electronic device 200, under the control of the processor 120, may control power for each of the first area 231*a* and the second area 231*b*, in operation 707.

In an embodiment, the electronic device 200, under the control of the processor 120, may differently control power supplied to each of the first area 231*a* and the second area 231*b*, in operation 707.

In an embodiment, the electronic device 200, under the control of the processor 120, may differently control the display configuration for each of the first area 231*a* and the second area 231*b*, in operation 707.

In an embodiment, if the electronic device 200 is in the partially folded state and in the stand state and if the application being executed is the application that allows adjustment for each area, the electronic device 200, under the control of the processor 120, may perform control to reduce the consumption power in the area of the flexible display 230 disposed in the housing structure, among the first housing structure 210 and the second housing structure 220, whose rear surface faces the ground, in operation 707.

In an embodiment, if the electronic device 200 is in the partially folded state and in the stand state and if the application being executed is the application that allows adjustment for each area, the electronic device 200, under the control of the processor 120, may perform control to maintain the consumption power in the area of the flexible display 230 that the user is gazing at and reduce the consumption power in the area of the flexible display 230 that the user is not gazing at, in operation 707. The electronic device 200 may detect whether or not the user is gazing at the flexible display 230 using a camera or an infrared sensor included in the electronic device 200.

In an embodiment, if the electronic device 200 is in the partially folded state and in the stand state and if the application being executed is the application that allows adjustment for each area, the electronic device 200, under the control of the processor 120, may reduce the consumption power in the area of the flexible display 230 disposed in the housing structure, among the first housing structure 210 and the second housing structure 220, whose rear surface faces the ground and maintain the consumption power in the area of the flexible display 230 disposed in the housing structure that is in the stand state, in operation 707.

In an embodiment, if the electronic device 200 is in the partially folded state and in the stand state and if the application being executed is the application that allows adjustment for each area, the electronic device 200, under the control of the processor 120, may dispose a controller interface (e.g., a virtual keypad, a media controller, or a handwriting input controller) in the area in which the consumption power is reduced and display an output interface (e.g., a document output interface, a handwriting output interface, a video output interface, or a music output interface) on the area in which the consumption power is maintained, in operation 707.

For example, if it is determined that the electronic device 200 is in the partially folded state and that the rear surface of the first housing structure 210 faces the ground, and if the application being executed is the application that allows adjustment for each area, the electronic device 200, under the control of the processor 120, may perform control to reduce the consumption power in the first area 231*a* disposed in the first housing structure 210.

For example, if it is determined that the electronic device 200 is in the partially folded state and that the rear surface of the first housing structure 210 faces the ground, and if the application being executed is the application that allows adjustment for each area, the electronic device 200 may control the processor 120 such that the second area 231*b* operates with a predetermined resolution (e.g., FHD) or a resolution higher than the predetermined resolution and such that the first area 231*a* operates with a resolution lower than the predetermined resolution.

For example, if it is determined that the electronic device 200 is in the partially folded state and that the rear surface of the first housing structure 210 faces the ground, and if the application being executed is the application that allows adjustment for each area, the electronic device 200 may control the processor 120 such that the second area 231*b* operates with predetermined luminance or luminance higher than the predetermined luminance and such that the first area 231*a* operates with luminance lower than the predetermined luminance.

For example, if it is determined that the electronic device 200 is in the partially folded state and that the rear surface of the first housing structure 210 faces the ground, and the application being executed is the application that allows adjustment for each area, the electronic device 200 may control the processor 120 such that the second area 231*b* operates with predetermined gamma properties or gamma properties higher than the predetermined gamma properties and such that the first area 231*a* operates with gamma properties lower than the predetermined gamma properties.

For example, if it is determined that the electronic device 200 is in the partially folded state and that the rear surface of the first housing structure 210 faces the ground, and if the application being executed is the application that allows adjustment for each area, the second area 231*b* may operate with predetermined color representation or color representation higher than the predetermined color representation, and the first area 231*a* may operate with color representation lower than the predetermined color representation.

For example, if it is determined that the electronic device 200 is in the partially folded state and that the rear surface of the first housing structure 210 faces the ground, and if the application being executed is the application that allows adjustment for each area, the second area 231*b* may operate with a predetermined white scale or a white scale higher than the predetermined white scale, and the first area 231*a* may operate with a white scale lower than the predetermined white scale.

For example, if it is determined that the electronic device 200 is in the partially folded state and that the rear surface of the second housing structure 220 faces the ground, and if the application being executed is the application that allows adjustment for each area, the electronic device 200, under the control of the processor 120, may perform control to reduce the power consumption in the second area 231*b* disposed in the second housing structure 220.

For example, if it is determined that the electronic device 200 is in the partially folded state and that the rear surface of the second housing structure 220 faces the ground, and if the application being executed is the application that allows adjustment for each area, the electronic device 200 may control the processor 120 such that the first area 231*a* operates with a predetermined resolution (e.g., FHD) or a resolution higher than the predetermined resolution and such that the second area 231*b* operates with a resolution lower than the predetermined resolution.

For example, if it is determined that the electronic device 200 is in the partially folded state and that the rear surface of the second housing structure 220 faces the ground, and if the application being executed is the application that allows adjustment for each area, the electronic device 200 may control the processor 120 such that the first area 231*a* operates with predetermined luminance or luminance higher than the predetermined luminance and such that the second area 231*b* operates with luminance lower than the predetermined luminance.

For example, if it is determined that the electronic device 200 is in the partially folded state and that the rear surface of the second housing structure 220 faces the ground, and if the application being executed is the application that allows adjustment for each area, the electronic device 200 may control the processor 120 such that the first area 231*a* operates with predetermined gamma properties or gamma properties higher than the predetermined gamma properties and such that the second area 231*b* operates with gamma properties lower than the predetermined gamma properties.

For example, if it is determined that the electronic device 200 is in the partially folded state and that the rear surface of the second housing structure 220 faces the ground, and if the application being executed is the application that allows adjustment for each area, the first area 231*a* may operate with predetermined color representation or color representation higher than the predetermined color representation, and the second area 231*b* may operate with color representation lower than the predetermined color representation.

For example, if it is determined that the electronic device 200 is in the partially folded state and that the rear surface of the second housing structure 220 faces the ground, and if the application being executed is the application that allows adjustment for each area, the first area 231*a* may operate with a predetermined white scale or a white scale higher than the predetermined white scale, and the second area 231*b* may operate with a white scale lower than the predetermined white scale.

In this document, although the adjustment processes of the display configuration (e.g., resolution, luminance, gamma properties, color representation, refresh rate, or white scale) for the electronic device 200 to control the power consumption in the first area 231*a* and/or the second area 232*b* have been respectively described, the disclosure is not limited thereto, and the power consumption in any one area may be controlled by a combination of the above-described adjustment methods.

For example, the display configuration may be at least one or more of the resolution, the luminance, the gamma properties, the color representation, refresh rate, or the white scale.

In an embodiment, the electronic device 200, under the control of the processor 120, may maintain the control operation of the flexible display, in operation 709.

In an embodiment, the electronic device 200, under the control of the processor 120, may maintain the power consumption control operation of the flexible display 230, in operation 709.

In an embodiment, the electronic device 200, under the control of the processor 120, may maintain the control operation such that the areas (e.g., the first area 231*a* and the second area 232*b*) of the flexible display 230 have substantially the same power consumption, in operation 709.

Figure 8:
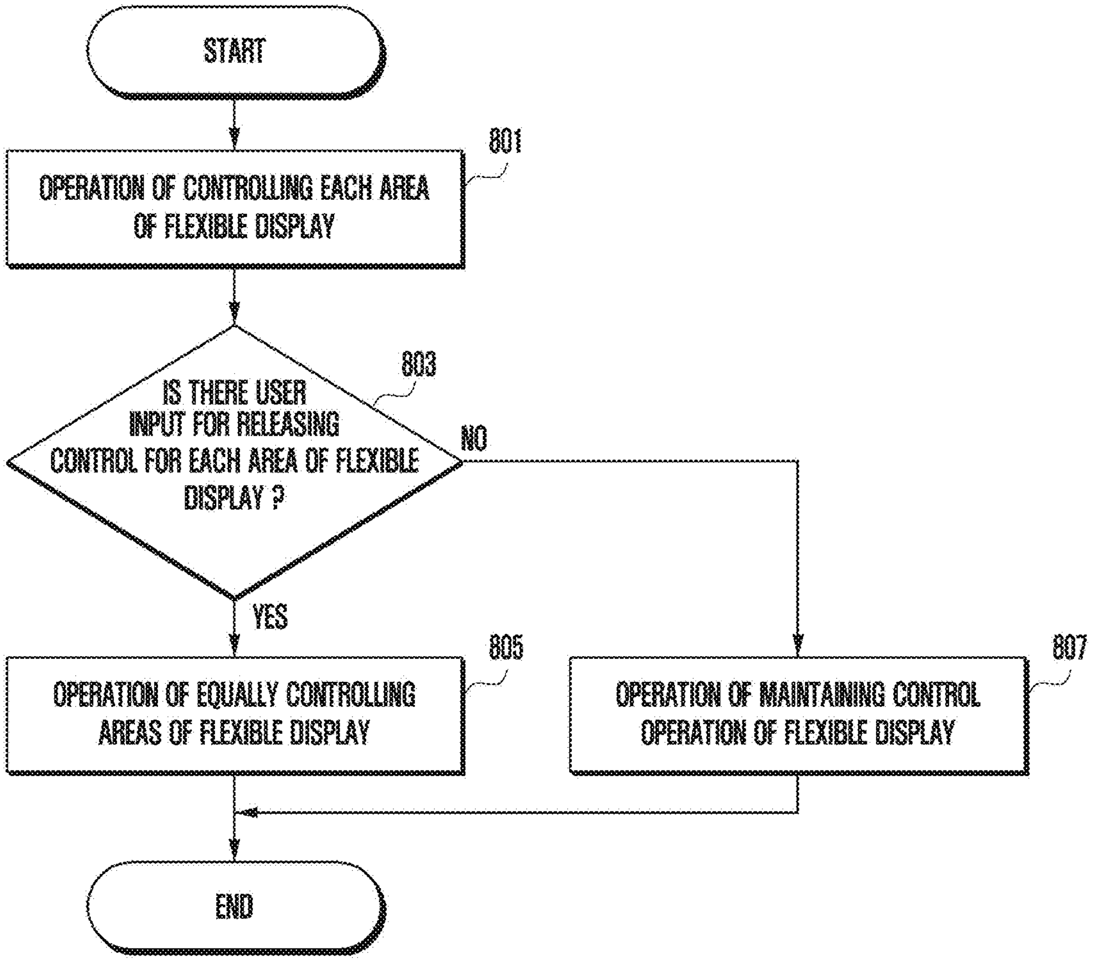
FIG. 8 is a flowchart illustrating a method of controlling a display of an electronic device according to an embodiment of the disclosure.

FIG. 8 is a flowchart illustrating a method of controlling a display of an electronic device according to an embodiment of the disclosure.

Referring to FIG. 8, in an embodiment, the electronic device 200, under the control of the processor 120, may control each area of the flexible display 230, in operation 801. Operation 801 in FIG. 8 may indicate the state in which the electronic device 200 is executing operation 707 in FIG. 7. Operation 801 in FIG. 8 may be the same as operation 707 in FIG. 7.

In an embodiment, the electronic device 200, under the control of the processor 120, may determine whether or not there is a user input for releasing the control for each area of the flexible display 230, in operation 803.

In an embodiment, the user input for releasing the control for each area of the flexible display 230 may be an operation of simultaneously touching the first area 231*a* and the second area 231*b* of the of the flexible display 230 and holding the touch for a predetermined time.

In an embodiment, the user input for releasing the control for each area of the flexible display 230 may be an input of touching a specific area of the flexible display 230 (e.g., the folding area 231*c* of the flexible display 230).

In an embodiment, the user input for releasing the control for each area of the flexible display 230 may be an input of touching the flexible display 230 in a specific method (e.g., a predetermined number of tap inputs). For example, the user input for releasing the control for each area of the flexible display 230 may be a specific touch input of tapping a predetermined number of times.

In an embodiment, the user input for releasing the control for each area of the flexible display 230 may be an input using a specific input tool. For example, if there is an input by pen as a tool, instead of a hand input, the electronic device 200 may release the control for each area of the flexible display 230.

In an embodiment, the user input for releasing the control for each area of the flexible display 230 may be a user input to a user interface related to release, which is displayed on the flexible display 230. For example, the user interface related to release may be displayed as an icon.

In an embodiment, if there is a user input for releasing the control for each area of the flexible display 230, the electronic device 200, under the control of the processor 120, may proceed to operation 805 from operation 803.

In an embodiment, if there is no user input for releasing the control for each area of the flexible display 230, the electronic device 200, under the control of the processor 120, may proceed to operation 807 from operation 803.

In an embodiment, the electronic device 200, under the control of the processor 120, may equally control the areas of the flexible display 230, in operation 805.

In an embodiment, the electronic device 200, under the control of the processor 120, may equally control power of the areas of the flexible display 230, in operation 805.

In an embodiment, the electronic device 200, under the control of the processor 120, may equally control power supply to the areas of the flexible display 230, in operation 805.

In an embodiment, the electronic device 200, under the control of the processor 120, may equally control the display configuration of the areas of the flexible display 230, in operation 805.

In an embodiment, the electronic device 200, under the control of the processor 120, may apply the display configuration of an area in which the power consumption is maintained to the display configuration of an area in which the power consumption is reduced, in operation 805.

In an embodiment, the electronic device 200, under the control of the processor 120, may call the display configuration of an area in which the power consumption is maintained and apply the same to the display configuration of an area in which the power consumption is reduced, in operation 805.

In an embodiment, the electronic device 200, under the control of the processor 120, may maintain the control operation of the flexible display 230, in operation 807.

In an embodiment, the electronic device 200, under the control of the processor 120, may maintain the power control operation for each area of the flexible display 230, in operation 807.

In an embodiment, the electronic device 200, under the control of the processor 120, may maintain the control operation for each area of the flexible display 230, in operation 807.

Figure 9:
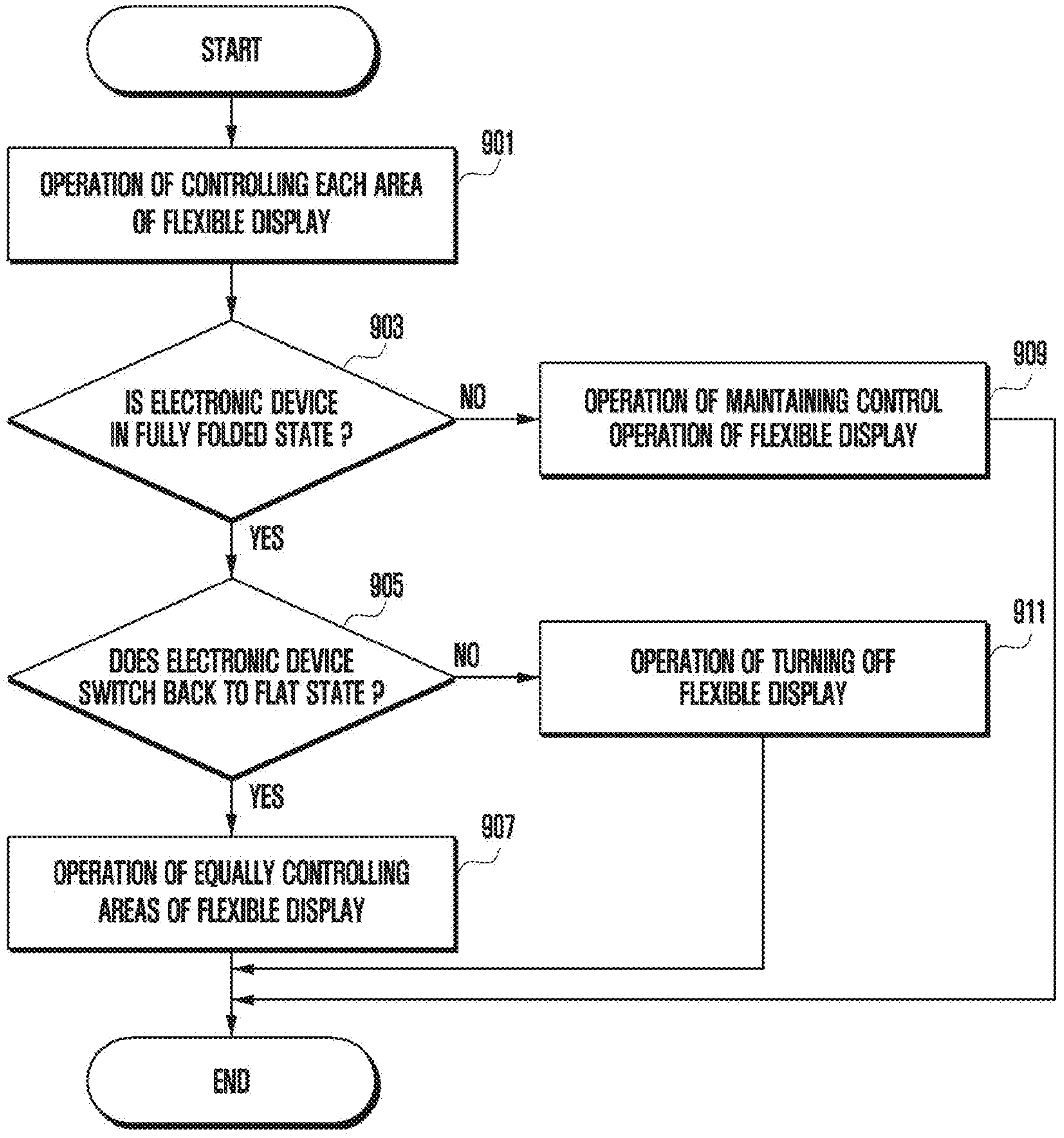
FIG. 9 is a flowchart illustrating a method of controlling a display of an electronic device according to an embodiment of the disclosure.

FIG. 9 is a flowchart illustrating a method of controlling a display of an electronic device according to an embodiment of the disclosure.

Referring to FIG. 9, in an embodiment, the electronic device 200, under the control of the processor 120, may control each area of the flexible display 230, in operation 901. Operation 901 in FIG. 9 may indicate the state in which the electronic device 200 is executing operation 707 in FIG. 7. Operation 901 in FIG. 9 may be the same as operation 707 in FIG. 7.

In an embodiment, the electronic device 200, under the control of the processor 120, may determine whether or not the electronic device 200 switches to the fully folded state, in operation 903.

In an embodiment, if the electronic device 200 is in the fully folded state, the electronic device 200, under the control of the processor 120, may proceed to operation 905 from operation 903.

In an embodiment, if the electronic device 200 is in the partially folded state or the flat state, instead of in the fully folded state, the electronic device 200, under the control of the processor 120, may proceed to operation 909 from operation 903.

In an embodiment, the electronic device 200, under the control of the processor 120, may determine whether or not the electronic device 200 switches from the fully folded state back to the flat state, in operation 905.

In an embodiment, the electronic device 200, under the control of the processor 120, may determine whether or not the electronic device 200 switches from the fully folded state back to the flat state during a predetermined time, in operation 905.

In an embodiment, if the electronic device 200 switches from the fully folded state back to the flat state, the electronic device 200, under the control of the processor 120, may proceed to operation 907 from operation 905.

In an embodiment, if the electronic device 200 remains in the fully folded state, the electronic device 200, under the control of the processor 120, may proceed to operation 911 from operation 905.

In an embodiment, the electronic device 200, under the control of the processor 120, may equally control the areas of the flexible display 230, in operation 907.

In an embodiment, the electronic device 200, under the control of the processor 120, may apply the display configuration of an area in which the power consumption is maintained to the display configuration of an area in which the power consumption is reduced, in operation 907.

In an embodiment, the electronic device 200, under the control of the processor 120, may call the display configuration of an area in which the power consumption is maintained and apply the same to the display configuration of an area in which the power consumption is reduced, in operation 907.

In an embodiment, the electronic device 200, under the control of the processor 120, may maintain the control operation of the flexible display 230, in operation 909.

In an embodiment, the electronic device 200, under the control of the processor 120, may maintain the power control operation for each area of the flexible display 230, in operation 909.

In an embodiment, the electronic device 200, under the control of the processor 120, may maintain the control operation for each area of the flexible display 230, in operation 909.

In an embodiment, if the electronic device 200 switches to the fully folded state, the electronic device 200, under the control of the processor 120, may turn off the flexible display 230, in operation 911.

Figure 10:
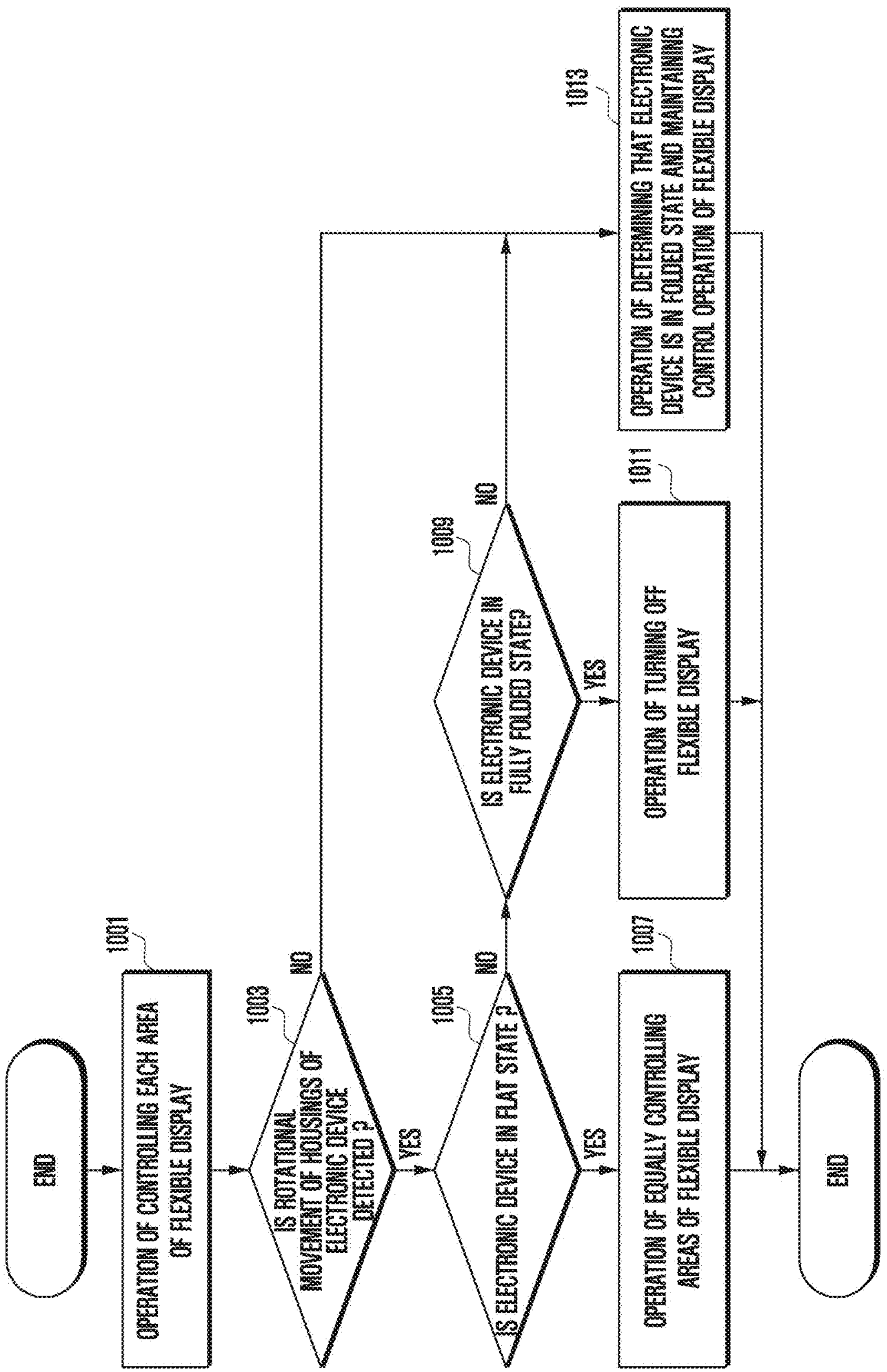
FIG. 10 is a flowchart illustrating a method of controlling a display of an electronic device according to an embodiment of the disclosure.

FIG. 10 is a flowchart illustrating a method of controlling a display of an electronic device according to an embodiment of the disclosure.

Referring to FIG. 10, in an embodiment, the electronic device 200, under the control of the processor 120, may control each area of the flexible display 230, in operation 1001. Operation 1001 in FIG. 10 may indicate the state in which the electronic device 200 is executing operation 707 in FIG. 7. Operation 1001 in FIG. 10 may be the same as operation 707 in FIG. 7.

In an embodiment, the electronic device 200, under the control of the processor 120, may determine whether or not rotational movement of the housing structure (e.g., the first housing structure 210 or the second housing structure 220) of the electronic device 200 is detected, in operation 1003.

If the rotational movement of the housing structure (e.g., the first housing structure 210 or the second housing structure 220) of the electronic device 200 is detected, the electronic device 200, under the control of the processor 120, may proceed to operation 1005 from operation 1003.

If the rotational movement of the housing structure (e.g., the first housing structure 210 or the second housing structure 220) of the electronic device 200 is not detected, the electronic device 200, under the control of the processor 120, may proceed to operation 1013 from operation 1003.

In an embodiment, the electronic device 200, under the control of the processor 120, may determine whether or not the electronic device 200 is in the flat state, in operation 1005.

If it is determined that the electronic device 200 is in the flat state, the electronic device 200, under the control of the processor 120, may proceed to operation 1007 from operation 1005.

If it is determined that the electronic device 200 is not in the flat state, the electronic device 200, under the control of the processor 120, may proceed to operation 1009 from operation 1005.

In an embodiment, the electronic device 200, under the control of the processor 120, may equally control the areas of the flexible display 230, in operation 1007.

In an embodiment, the electronic device 200, under the control of the processor 120, may apply the display configuration of the area in which the power consumption is maintained to the display configuration of the area in which the power consumption is reduced, in operation 1007.

In an embodiment, the electronic device 200, under the control of the processor 120, may call the display configuration of the area in which the power consumption is maintained and apply the same to the display configuration of the area in which the power consumption is reduced, in operation 1007.

In an embodiment, the electronic device 200, under the control of the processor 120, may determine whether or not the electronic device 200 is in the fully folded state, in operation 1009.

If it is determined that the electronic device 200 is in the fully folded state, the electronic device 200, under the control of the processor 120, may proceed to operation 1011 from operation 1009.

If it is determined that the electronic device 200 is not in the fully folded state, the electronic device 200, under the control of the processor 120, may proceed to operation 1013 from operation 1009.

In an embodiment, if the electronic device 200 is in the fully folded state, the electronic device 200, under the control of the processor 120, may turn off the flexible display 230, in operation 1011.

In an embodiment, the electronic device 200, under the control of the processor 120, may determine that the electronic device 200 is in the partially folded state and maintain the control operation of the flexible display 230, in operation 1013.

In an embodiment, the electronic device 200, under the control of the processor 120, may determine that the electronic device 200 is in the partially folded state and maintain the power control operation for each area of the flexible display 230, in operation 1013.

In an embodiment, the electronic device 200, under the control of the processor 120, may determine that the electronic device 200 is in the partially folded state and maintain the control operation for each area of the flexible display 230, in operation 1013.

Figure 11:
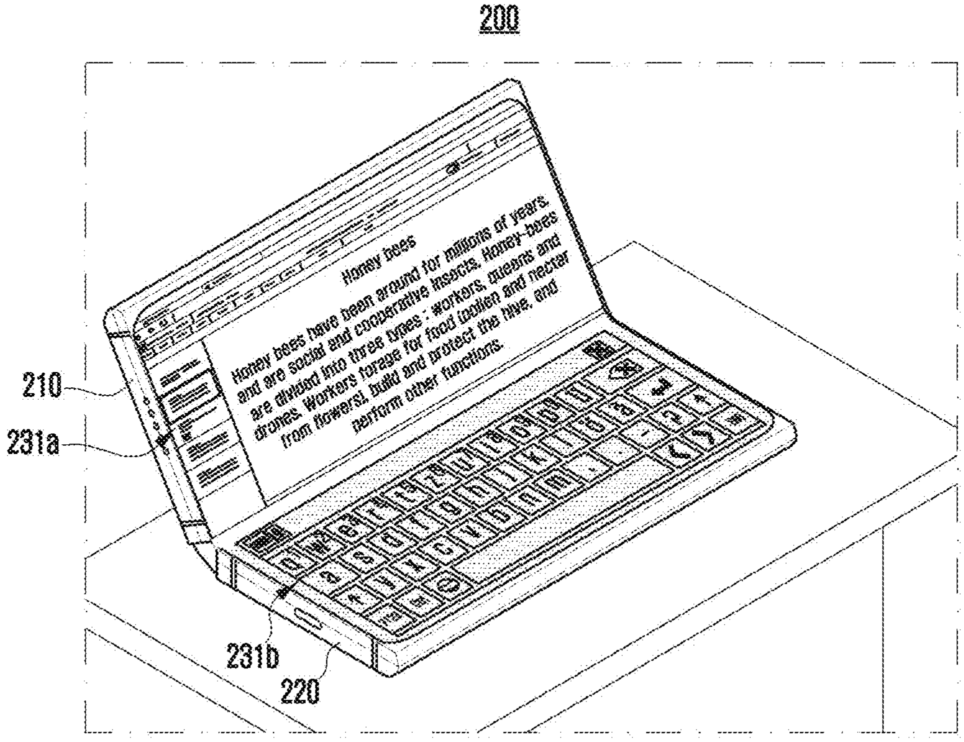
FIG. 11 is a diagram illustrating a method of controlling a display of an electronic device according to an embodiment of the disclosure.

FIG. 11 is a diagram illustrating a method of controlling a display of an electronic device according to an embodiment of the disclosure.

The application that allows adjustment for each area of the flexible display 230 may be, for example, a media application or a note application, but is not limited thereto.

Referring to FIG. 11, the application being executed in the electronic device 200 may be a note application.

The application that allows adjustment for each area of the flexible display 230 may be an application that includes a controller interface and an output interface. For example, the controller interface may be a virtual keypad, a media controller (e.g., play, pause, stop, and progress bar), or a handwriting input interface (e.g., pen, eraser, and line colors). The output interface may be a document output interface, a handwriting output interface, a video output interface, or a music output interface.

Referring to FIG. 11, if the electronic device 200 is in the partially folded state and in the stand state, and if the application being executed is the application (e.g., a note application) that allows adjustment for each area, the electronic device 200, under the control of the processor 120, may reduce the consumption power in the area (e.g., the second area 231*b*) of the flexible display 230 disposed in the second housing structure 220, among the first housing structure 210 and the second housing structure 220, whose rear surface faces the ground and maintain the consumption power in the area (e.g., the first area 231*a*) of the flexible display 230 disposed in the first housing structure 210 that is in the stand state.

Referring to FIG. 11, if the electronic device 200 is in the partially folded state and in the stand state, and if the application being executed is the application (e.g., a note application) that allows adjustment for each area, the electronic device 200, under the control of the processor 120, may dispose the controller interface (e.g., a virtual keypad) in the area (e.g., the second area 231*b*) in which the consumption power is reduced and display the output interface (e.g., a document output interface) on the area (e.g., the first area 231*a*) in which the consumption power is maintained.

Referring to FIG. 11, if it is determined that the electronic device 200 is in the partially folded state and that the rear surface of the second housing structure 220 faces the ground, and if the application being executed is the application (e.g., a note application) that allows adjustment for each area, the electronic device 200 may control the processor 120 to control the display configuration of the first area 231*a* and the second area 231*b*.

Referring to FIG. 11, if it is determined that the electronic device 200 is in the partially folded state and that the rear surface of the second housing structure 220 faces the ground, and if the application being executed is the application (e.g., a note application) that allows adjustment for each area, the electronic device 200 may control the processor 120 such that such that the first area 231*a* operates with a predetermined resolution (e.g., FHD) or a resolution higher than the predetermined resolution and such that the second area 231*b* operates with a resolution lower than the predetermined resolution.

Referring to FIG. 11, if it is determined that the electronic device 200 is in the partially folded state and that the rear surface of the second housing structure 220 faces the ground, and if the application being executed is the application (e.g., a note application) that allows adjustment for each area, the electronic device 200 may control the processor 120 such that the first area 231*a* operates with predetermined luminance or luminance higher than the predetermined luminance and such that the second area 231*b* operates with luminance lower than the predetermined luminance.

Referring to FIG. 11, if it is determined that the electronic device 200 is in the partially folded state and that the rear surface of the second housing structure 220 faces the ground, and the application being executed is the application (e.g., a note application) that allows adjustment for each area, the electronic device 200 may control the processor 120 such that the first area 231*a* operates with predetermined gamma properties or gamma properties higher than the predetermined gamma properties and such that the second area 231*b* operates with gamma properties lower than the predetermined gamma properties.

Referring to FIG. 11, if it is determined that the electronic device 200 is in the partially folded state and that the rear surface of the second housing structure 220 faces the ground, and if the application being executed is the application (e.g., a note application) that allows adjustment for each area, the first area 231*a* may operate with predetermined color representation or color representation higher than the predetermined color representation, and the second area 231*b* may operate with color representation lower than the predetermined color representation.

Referring to FIG. 11, if it is determined that the electronic device 200 is in the partially folded state and that the rear surface of the second housing structure 220 faces the ground, and if the application being executed is the application (e.g., a note application) that allows adjustment for each area, the first area 231*a* may operate with a predetermined white scale or a white scale higher than the predetermined white scale, and the second area 231*b* may operate with a white scale lower than the predetermined white scale.

Figure 12:
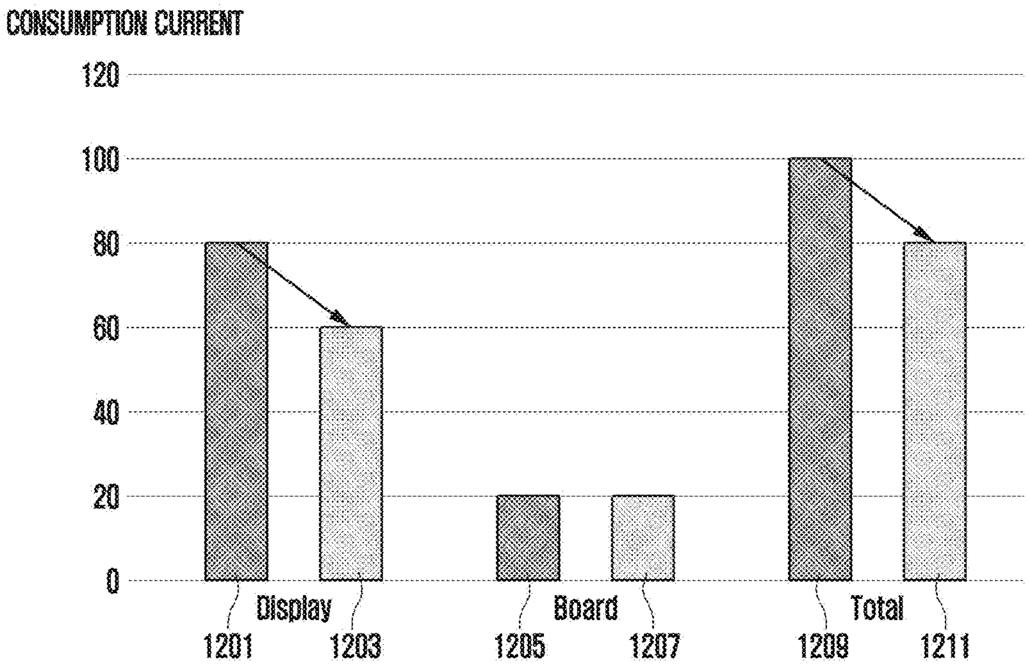
FIG. 12 is a graph showing improvement in consumption efficiency of an electronic device to which a display control method of the disclosure is applied according to an embodiment of the disclosure.

FIG. 12 is a graph showing improvement in consumption efficiency of an electronic device to which a display control method of the disclosure is applied according to an embodiment of the disclosure.

Referring to FIG. 12, graphs 1201, 1205, and 1209 are consumption power graphs of general electronic devices, and graphs 1203, 1207, and 1211 are consumption power graphs of the electronic device 200 of the disclosure.

Graph 1201 indicates consumption power of a display of the general electronic device, and graph 1203 indicates consumption power of a display of the electronic device 200 of the disclosure. Referring to graphs 1201 and 1203, the consumption power of the display of the electronic device 200 of the disclosure may be improved by about 25%, compared to the consumption power of the display of the general electronic device.

Graph 1205 indicates consumption power of a board of the general electronic device, and graph 1207 indicates consumption power of a board of the electronic device 200 of the disclosure. Referring to graphs 1205 and 1207, there may be no difference in the efficiency between the consumption power of the board of the electronic device 200 of the disclosure and the consumption power of the board of the general electronic device.

Graph 1209 indicates total consumption power of the general electronic device, and graph 1211 indicates total consumption power of the electronic device 200 of the disclosure. Referring to graphs 1209 and 1211, the total consumption power of the electronic device 200 to which the display control method of the disclosure is applied may be improved by about 20%, compared to the total consumption power of the general electronic devices.

Figure 13A:
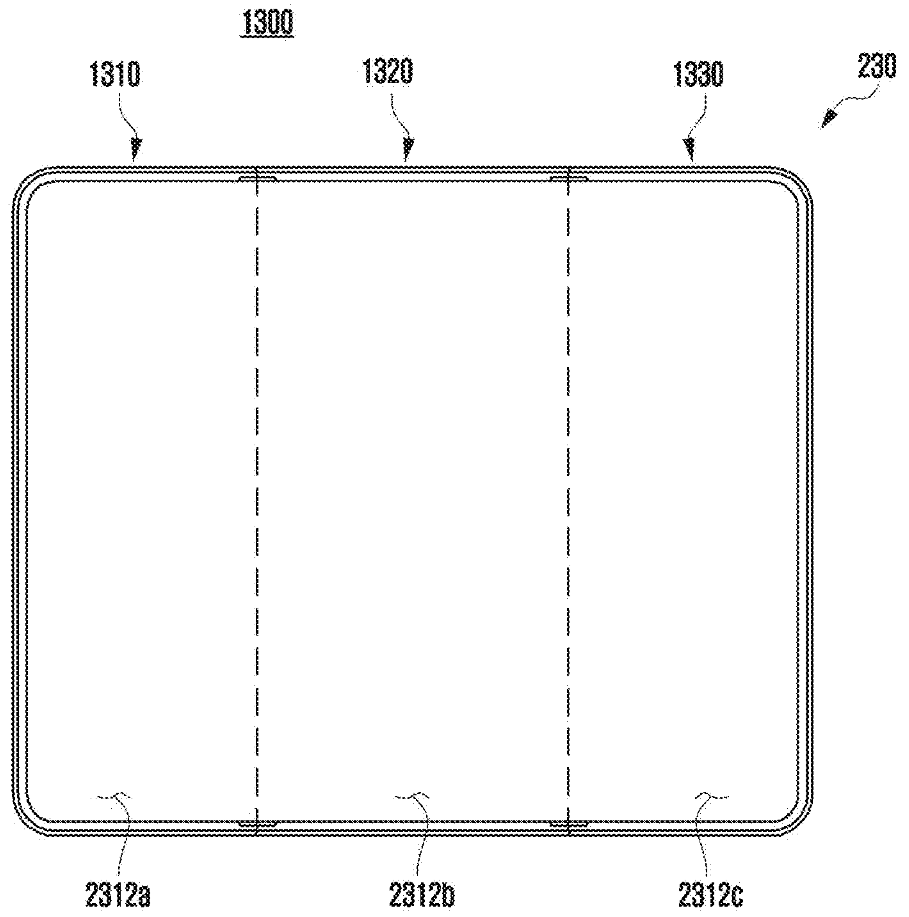
FIGS. 13A, 13B, and 13C illustrate an electronic device including a display control method according to various embodiments of the disclosure.
Figure 13B:
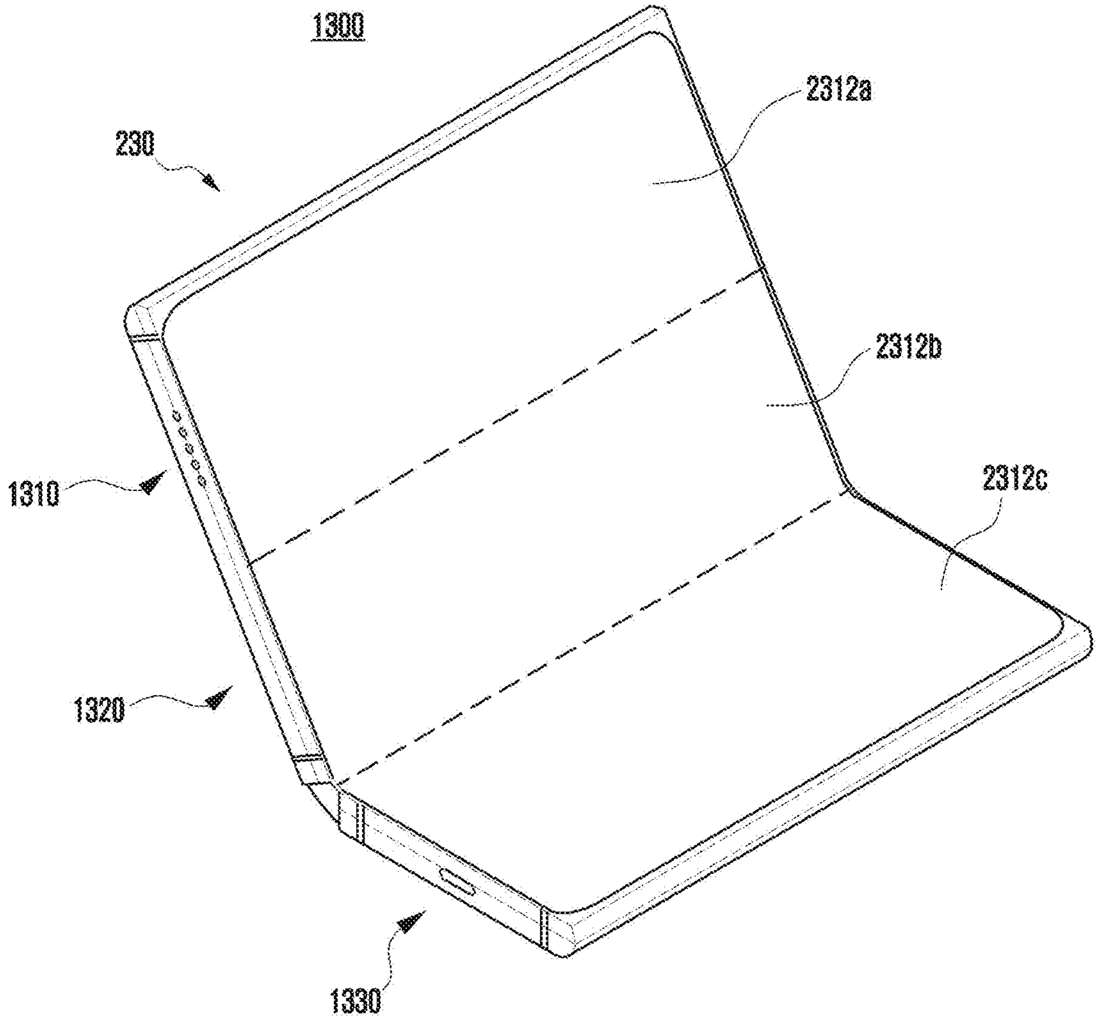
Figure 13C:
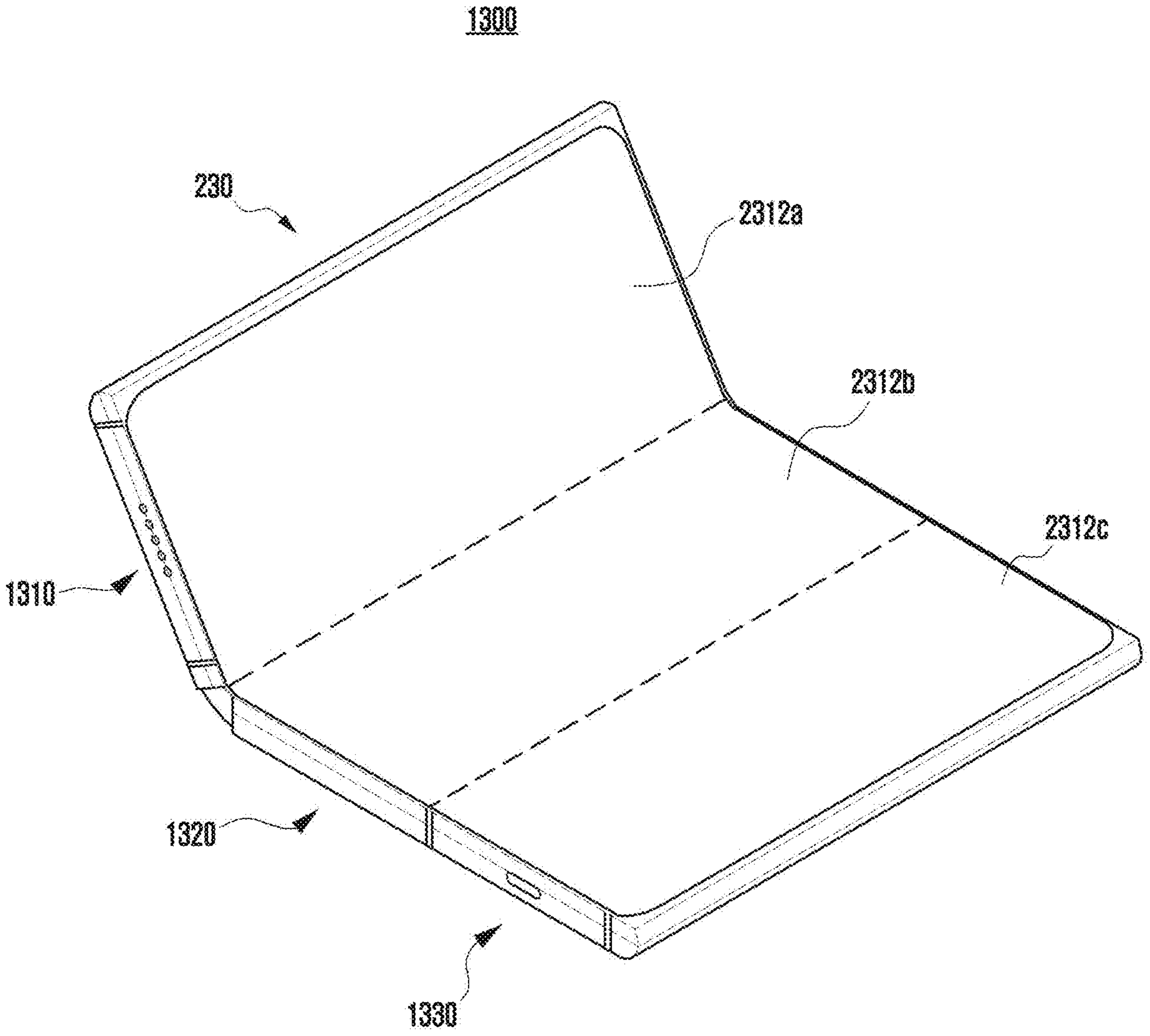

FIGS. 13A, 13B, and 13C illustrate an electronic device including a display control method according to various embodiments of the disclosure.

Electronic device 1300 in FIGS. 13A to 13C may include three housing structures 1310, 1320, and 1330, and the areas of the flexible display 230 respectively corresponding to the housings may include three areas 2312*a*, 2312*b*, and 2312*c*.

Referring to FIG. 13A, an electronic device 1300 may be in the flat state, and the electronic device 1300 may perform control such that the three areas 2312*a*, 2312*b*, and 2312*c* of the flexible display 230 consume substantially the same power.

Referring to FIG. 13B, if the electronic device 1300 is in the partially folded state and if the rear surface of one housing structure 1330 faces the ground, the electronic device 1300 may perform control to reduce the power of the area 2312*c* corresponding to the housing structure 1330 facing the ground, among the three areas 2312*a*, 2312*b*, and 2312*c* of the flexible display 230, and maintain the power consumption in the remaining areas 2312*a* and 2312*b*.

Referring to FIG. 13C, if the electronic device 1300 is in the partially folded state and if the rear surfaces of two housing structures 1320 and 1330 face the ground, the electronic device 1300 may perform control to reduce the power of the area 2312*b* and 2312*c* corresponding to the housing structures 1320 and 1330 facing the ground, among the three areas 2312*a*, 2312*b*, and 2312*c* of the flexible display 230, and maintain the power consumption in the remaining area 2312*a*.

An electronic device 200 may include a hinge structure 264, a foldable housing that includes a first housing structure 210 coupled to the hinge structure 264 and including a first surface facing in a first direction and a second surface facing in a second direction opposite the first direction, and a second housing structure 220 coupled to the hinge structure 264, including a third surface facing in a third direction and a fourth surface facing in a fourth direction opposite the third direction, and configured to be folded relative to the first housing structure 210 around the hinge structure 264, and is configured such that the first surface faces the third surface in a fully folded state, a flexible display 230 extending from the first surface to the third surface to form the first surface and the third surface, and including a first area corresponding to the first surface and a second area 231*b* corresponding to the third surface, a first display driving circuit 610 configured to control display operation of the first area 231*a*, a second display driving circuit 620 configured to control display operation of the second area 231*b*, at least one sensor, and a processor 120, wherein the processor 120 may be configured to determine whether or not the electronic device 200 is in a folded state and whether or not the electronic device is in a stand state based on the at least one sensor, determine whether or not an application being executed is an application that allows adjustment for each area of the flexible display 230, and, if the electronic device 200 is in the folded state and in the stand state and if the application being executed is an application that allows adjustment for each area, control power for each area of the flexible display 230.

The processor 120 may differently control power of the first area 231*a* and power of the second area 231*b* if the electronic device 200 is in the folded state and in the stand state and if the application being executed is an application that allows adjustment for each area.

The processor 120 may differently control power of the first area 231*a* and display configuration of the second area 231*b* if the electronic device is in the folded state and in the stand state and if the application being executed is an application that allows adjustment for each area.

The display configuration may be at least one of resolution, luminance, gamma properties, color representation, refresh rate, or white scales.

The stand state may be a state in which the second surface of the first housing structure 210 or the fourth surface of the second housing structure 220 faces the ground when the electronic device 200 is in the folded state.

The processor 120 may perform control to reduce power consumption of the first area disposed in the first housing structure 210 if the electronic device 200 is determined to be in the folded state, if the second surface of the first housing structure 210 is determined to face the ground, and if the application being executed is an application that allows adjustment for each area.

The processor 120 may perform control to reduce power consumption of the second area 231*b* disposed in the second housing structure 220 if the electronic device 200 is determined to be in the folded state, if the fourth surface of the second housing structure 220 is determined to face the ground, and if the application being executed is an application that allows adjustment for each area.

The processor 120 may determine whether or not there is a user input for releasing the control for each area of the flexible display 230 and, if there is a user input for releasing the control for each area of the flexible display 230, equally control the areas of the flexible display 230.

The processor 120 may equally control display configuration for the areas of the flexible display 230 if there is a user input for releasing the control for each area of the flexible display 230.

The processor 120 may determine whether or not the electronic device 200 switches to a fully folded state, determine whether or not the electronic device 200 switches from the fully folded state back to the flat state, and, if the electronic device 200 switches from the fully folded state back to the flat state, equally control display configuration for the areas of the flexible display 230.

A method for controlling a display of an electronic device 200 may include determining whether or not the electronic device 200 is in a folded state and whether or not the electronic device 200 is in a stand state, based on the at least one sensor, determining whether or not an application being executed is an application that allows adjustment for each area of the flexible display 230, and, if the electronic device 200 is in the folded state and in the stand state and if the application being executed is an application that allows adjustment for each area, controlling power for each area of the flexible display 230.

In the method, the controlling of the power for each area of the flexible display 230 may include differently controlling power of the first area 231*a* of the flexible display 230 and power of the second area 231*b* of the flexible display 230 if the electronic device 200 is in the folded state and in the stand state, and if the application being executed is an application that allows adjustment for each area.

In the method, the controlling of the power for each area of the flexible display 230 may include differently controlling power of the first area 231*a* of the flexible display 230 and display configuration of the second area 231*b* of the flexible display 230 if the electronic device 200 is in the folded state and in the stand state and if the application being executed is an application that allows adjustment for each area.

The display configuration may be at least one of resolution, luminance, gamma properties, color representation, refresh rate, or white scales.

The stand state may be a state in which the rear surface of the first housing structure 210 or the rear surface of the second housing structure 220 faces the ground when the electronic device 200 is in the folded state.

The method may include performing control to reduce power consumption of a first area disposed in the first housing structure 210 if the electronic device 200 is determined to be in the folded state, if the rear surface of the first housing structure 210 is determined to face the ground, and if the application being executed is an application that allows adjustment for each area.

The method may include performing control to reduce power consumption of the second area 231*b* disposed in the second housing structure 220 if the electronic device 200 is determined to be in the folded state, if the rear surface of the second housing structure 220 is determined to face the ground, and if the application being executed is an application that allows adjustment for each area.

The method may include determining whether or not there is a user input for releasing the control for each area of the flexible display 230 and, if there is a user input for releasing the control for each area of the flexible display 230, equally controlling the areas of the flexible display 230.

The method may include equally controlling display configuration for the areas of the flexible display 230 if there is a user input for releasing the control for each area of the flexible display 230.

The method may include determining whether or not the electronic device 200 switches to a fully folded state, determining whether or not the electronic device 200 switches from the fully folded state back to the flat state, and, if the electronic device 200 switches from the fully folded state back to the flat state, equally controlling display configuration for the areas of the flexible display 230.

An electronic device 200 may include a flexible display 230, and a foldable housing 210, 220 configured to be movable between a flat state, a partially folded state and a fully folded state.

The foldable housing 210, 220 may include a first housing 210 configured to support a first area 231*a* of the flexible display 230, and a second housing 220 configured to support a second area 231*b* of the flexible display 230.

The electronic device 200 may include a first display driving circuit 610 configured to control the first area 231*a* of the flexible display 230, a second display driving circuit 620 configured to control the second area 231*b* of the flexible display 230, a processor 120, and a memory 130 storing instructions, which when executed by the processor 120, cause the electronic device 200 to: while the housing is in the flat state, display a first execution screen, corresponding to a first application, on the first area 231*a* and the second area 231*b* of the flexible display 230, while the first execution screen, corresponding to the first application, is displayed on the first area 231*a* and the second area 231*b* of the flexible display 230, identify the housing being moved from flat state to the partially folded state, based at least on the housing being moved from the flat state to the partially folded state, display a second execution screen corresponding to the first application, different from the first execution screen, on the first area 231*a* and the second area 231*b* of the flexible display 230, and while the second execution screen is displayed in the partially folded state, control the first display driving circuit 610 and the second driving circuit such that one of the first area 231*a* and the second area 231*b* of the flexible display 230, which is more closely aligned with a ground plane, consumes electrical power less than electrical power consumed by the other one of the first area 231*a* and the second area 231*b* of the flexible display 230.

The memory 130 further stores instructions, which when executed by the processor 120, cause the electronic device 200 to differently control power of the first area 231*a* and a display configuration of the second area 231*b* based on determining that the electronic device 200 is in the partially folded state and one of the first area 231*a* and the second area 231*b* of the flexible display 230 is closely aligned with a ground plane.

The display configuration corresponds to at least one of a resolution, luminance, gamma properties, a color representation, refresh rate, or white scales.

The memory 130 further stores instructions, which when executed by the processor 120, cause the electronic device 200 to perform control to reduce power consumption of the first area 231*a* disposed in the first housing 210 structure based on determining that the electronic device 200 is in the folded state and the first area 231*a* of the flexible display 230 is more closely aligned with a ground plane.

The memory 130 further stores instructions, which when executed by the processor 120, cause the electronic device 200 to perform control to reduce power consumption of the second area 231*b* disposed in the second housing 220 structure based on determining that the electronic device 200 is in the folded state and the second area 231*b* of the flexible display 230 is more closely aligned with a ground plane.

The memory 130 further stores instructions, which when executed by the processor 120, cause the electronic device 200 to determine whether there is a user input for releasing the control of power for each area of the flexible display 230, and equally control each area of the flexible display 230 based on determining that there is the user input for releasing the control of power for each area of the flexible display 230.

The memory 130 further stores instructions, which when executed by the processor 120, cause the electronic device 200 to determine whether an application being executed is an application that allows adjustment for each area of the flexible display 230 based on determining that the electronic device 200 is in the folded state and one of the first area 231*a* and the second area 231*b* of the flexible display 230 is closely aligned with a ground plane.

The memory 130 further stores instructions, which when executed by the processor 120, cause the electronic device 200 to control the first display driving circuit 610 and the second driving circuit to consume electrical power less than electrical power consumed by the other one of the first area 231*a* and the second area 231*b* of the flexible display 230 based on determining that the electronic device 200 is in the folded state, one of the first area 231*a* and the second area 231*b* of the flexible display 230 is closely aligned with a ground plane, and the application being executed is the application that allows adjustment for each area.

The memory 130 further stores instructions, which when executed by the processor 120, cause the electronic device 200 to equally control a display configuration for each area of the flexible display 230 based on determining that there is the user input for releasing the control of power for each area of the flexible display 230.

The memory 130 further stores instructions, which when executed by the processor 120, cause the electronic device 200 to determine whether the electronic device 200 switches to the fully folded state, determine whether the electronic device 200 switches from the fully folded state back to the flat state, and equally control a display configuration for each area of the flexible display 230 based on determining that the electronic device 200 switches from the fully folded state back to the flat state.

A method for controlling a display of an electronic device 200 may include while the electronic device 200 is in the flat state, displaying a first execution screen, corresponding to a first application, on the first area 231*a* and the second area 231*b* of the flexible display 230, while the first execution screen, corresponding to the first application, is displayed on the first area 231*a* and the second area 231*b* of the flexible display 230, identifying the housing being moved from flat state to the partially folded state, based at least on the electronic device 200 being moved from the flat state to the partially folded state, displaying a second execution screen corresponding to the first application, different from the first execution screen, on the first area 231*a* and the second area 231*b* of the flexible display 230, and while the second execution screen is displayed in the partially folded state, controlling a first display driving circuit 610 and a second driving circuit such that one of the first area 231*a* and the second area 231*b* of the flexible display 230, which is more closely aligned with a ground plane, consumes electrical power less than electrical power consumed by the other one of the first area 231*a* and the second area 231*b* of the flexible display 230.

In the method, the controlling a first display driving circuit 610 and a second driving circuit comprises, based on determining that the electronic device 200 is in the folded state and one of the first area 231*a* and the second area 231*b* of the flexible display 230 is closely aligned with a ground plane, differently controlling power of a first area 231*a* of the flexible display 230 and a display configuration of a second area 231*b* of the flexible display 230.

The display configuration corresponds to at least one of a resolution, luminance, gamma properties, a color representation, refresh rate, or white scales.

The method may include performing control to reduce power consumption of a first area 231*a* disposed in the first housing 210 structure based on determining that the electronic device 200 is in the folded state and the first area 231*a* of the flexible display 230 is more closely aligned with a ground plane.

The method may include performing control to reduce power consumption of a second area 231*b* of the flexible display 230 disposed in the second housing 220 structure based on determining that the electronic device 200 is in the folded state and the first area 231*a* of the flexible display 230 is more closely aligned with a ground plane.

The method may include determining whether there is a user input for releasing the control of power for each area of the flexible display 230, and equally controlling each area of the flexible display 230 based on determining that there is the user input for releasing the control of power for each area of the flexible display 230.

The method may include determining whether an application being executed is an application that allows adjustment for each area of the flexible display 230 based on determining that the electronic device 200 is in the folded state and one of the first area 231*a* and the second area 231*b* of the flexible display 230 is closely aligned with a ground plane.

The method may include controlling the first display driving circuit 610 and the second driving circuit to consume electrical power less than electrical power consumed by the other one of the first area 231*a* and the second area 231*b* of the flexible display 230 based on determining that the electronic device 200 is in the folded state, one of the first area 231*a* and the second area 231*b* of the flexible display 230 is closely aligned with a ground plane, and the application being executed is the application that allows adjustment for each area.

The method may include equally controlling a display configuration for each area of the flexible display 230 based on determining that there is the user input for releasing the control of power for each area of the flexible display 230.

The method may include determining whether the electronic device 200 switches to a fully folded state, determining whether the electronic device 200 switches from the fully folded state back to a flat state, and equally controlling a display configuration for each area of the flexible display 230 based on determining that the electronic device 200 switches from the fully folded state back to the flat state.

The electronic device according to various embodiments disclosed herein may be one of various types of electronic devices. The electronic devices may include, for example, a portable communication device (e.g., a smart phone), a computer device, a portable multimedia device, a portable medical device, a camera, a wearable device, or a home appliance. The electronic device according to embodiments of the disclosure is not limited to those described above.

It should be appreciated that various embodiments of the disclosure and the terms used therein are not intended to limit the technological features set forth herein to particular embodiments and include various changes, equivalents, or alternatives for a corresponding embodiment. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "a first," "a second," "the first," and "the second" may be used to simply distinguish a corresponding element from another, and does not limit the elements in other aspect (e.g., importance or order). It is to be understood that if an element (e.g., a first element) is referred to, with or without the term "operatively" or "communicatively," as "coupled with/to" or "connected with/to" another element (e.g., a second element), it denotes that the element may be coupled/connected with/to the other element directly (e.g., wiredly), wirelessly, or via a third element.

As used herein, the term "module" may include a unit implemented in hardware, software, or firmware, and may be interchangeably used with other terms, for example, "logic," "logic block," "component," or "circuit." The "module" may be a minimum unit of a single integrated component adapted to perform one or more functions, or a part thereof. For example, according to an embodiment, the "module" may be implemented in the form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply denotes that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each element (e.g., a module or a program) of the above-described elements may include a single entity or multiple entities. According to various embodiments, one or more of the above-described elements may be omitted, or one or more other elements may be added. Alternatively or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:

a flexible display;

a foldable housing configured to be movable between a flat state, a first folding state, and a second folding state, the foldable housing comprising:

a first housing configured to support a first area of the flexible display, and a second housing configured to support a second area of the flexible display;

at least one display driving circuit configured to control the first area and the second area of the flexible display;

memory storing one or more computer programs; and one or more processors communicatively coupled to the flexible display, the at least one display driving circuit, and the memory, wherein the one or more computer programs include computer-executable instructions that, when executed by the one or more processors, cause the electronic device to:

based at least on the foldable housing changing from the flat state to the first folding state while displaying a first execution screen on the first area and the second area, display a second execution screen on the first area and the second area of the flexible display, the second execution screen being different from the first execution screen, and based on displaying the second execution screen on the first area and the second area in the first folding state, control the at least one display driving circuit such that a first one of the first area or the second area of the flexible display, which is facing a ground, consumes a first amount of electrical power less than a second amount of electrical power consumed by a second one of the first area or the second area of the flexible display different from the first one.

2. The electronic device of claim 1, wherein the first folding state includes a partially folded state, and wherein the second folding state includes a fully folded state.

3. The electronic device of claim 1, wherein the one or more computer programs further include computer-executable instructions that, when executed by the one or more processors, cause the electronic device to:

based on determining that the electronic device is in the first folding state and one of the first area or the second area of the flexible display is facing the ground, differently control a display configuration of the first area and the second area.

4. The electronic device of claim 3, wherein the display configuration corresponds to at least one of a resolution, luminance, gamma properties, a color representation, refresh rate, or white scales.

5. The electronic device of claim 1, wherein the one or more computer programs further include computer-executable instructions that, when executed by the one or more processors, cause the electronic device to:

based on determining that the electronic device is in the first folding state and the first area of the flexible display is facing the ground, control to reduce power consumption of the first area disposed in the first housing.

6. The electronic device of claim 1, wherein the one or more computer programs further include computer-executable instructions that, when executed by the one or more processors, cause the electronic device to:

based on determining that the electronic device is in the first folding state and the second area of the flexible display is facing the ground, control to reduce power consumption of the second area disposed in the second housing.

7. The electronic device of claim 1, wherein the one or more computer programs further include computer-executable instructions that, when executed by the one or more processors, cause the electronic device to:

determine whether there is a user input for releasing a control of power for each area of the flexible display, and based on determining that there is the user input for releasing the control of power for each area of the flexible display, equally control each area of the flexible display.

8. The electronic device of claim 1, wherein the one or more computer programs further include computer-executable instructions that, when executed by the one or more processors, cause the electronic device to:

based on determining that the electronic device is in the first folding state and one of the first area or the second area of the flexible display is facing the ground, determine whether an application being executed is an application that allows adjustment for each area of the flexible display.

9. The electronic device of claim 8, wherein the one or more computer programs further include computer-executable instructions that, when executed by the one or more processors, cause the electronic device to:

based on determining that the electronic device is in the first folding state, the first one of the first area or the second area of the flexible display is facing the ground, and the application being executed is the application that allows adjustment for each area, control the at least one display driving circuit such that the first one of the first area or the second area of the flexible display consumes the first amount of electrical power less than the second amount of electrical power consumed by the second one of the first area or the second area of the flexible display different from the first one.

10. The electronic device of claim 1, wherein the one or more computer programs further include computer-executable instructions that, when executed by the one or more processors, cause the electronic device to:

determine whether the electronic device switches to the second folding state, determine whether the electronic device switches from the second folding state back to the flat state, and based on determining that the electronic device switches from the second folding state back to the flat state, equally control a display configuration for each area of the flexible display.

11. A method performed by an electronic device including at least one sensor and a flexible display, the method comprising:

based at least on the electronic device changing from a flat state to a first folding state while displaying a first execution screen on a first area and a second area, displaying a second execution screen on the first area and the second area of the flexible display, the second execution screen being different from the first execution screen; and based on displaying the second execution screen on the first area and the second area in the first folding state, controlling at least one display driving circuit such that a first one of the first area or the second area of the flexible display, which is facing a ground, consumes a first amount of electrical power less than a second amount of electrical power consumed by a second one of the first area or the second area of the flexible display different from the first one.

12. The method of claim 11, wherein the first folding state includes a partially folded state, and wherein a second folding state includes a fully folded state.

13. The method of claim 11, further comprising:

based on determining that the electronic device is in the first folding state and one of the first area or the second area of the flexible display is facing the ground, differently controlling a display configuration of the first area and the second area of the flexible display.

14. The method of claim 13, wherein the display configuration corresponds to at least one of a resolution, luminance, gamma properties, a color representation, refresh rate, or white scales.

15. The method of claim 11, further comprising:

based on determining that the electronic device is in the first folding state and the first area of the flexible display is facing the ground, performing control to reduce power consumption of the first area disposed in a first housing of the electronic device.

16. The method of claim 11, further comprising:

based on determining that the electronic device is in the first folding state and the second area of the flexible display is facing the ground, performing control to reduce power consumption of the second area of the flexible display disposed in a second housing of the electronic device.

17. The method of claim 11, further comprising:

determining whether there is a user input for releasing a control of power for each area of the flexible display; and based on determining that there is the user input for releasing the control of power for each area of the flexible display, equally controlling each area of the flexible display.

18. The method of claim 11, further comprising:

based on determining that the electronic device is in the first folding state and one of the first area or the second area of the flexible display is facing the ground, determining whether an application being executed is an application that allows adjustment for each area of the flexible display.

19. The method of claim 18, further comprising:

based on determining that the electronic device is in the first folding state, the first one of the first area or the second area of the flexible display is facing the ground, and the application being executed is the application that allows adjustment for each area, controlling the at least one display driving circuit such that the first one of the first area or the second area of the flexible display consumes the first amount of electrical power less than the second amount of electrical power consumed by the second one of the first area or the second area of the flexible display different from the first one.

20. The method of claim 11, further comprising:

determining whether the electronic device switches to a second folding state;

determining whether the electronic device switches from the second folding state back to the flat state; and based on determining that the electronic device switches from the second folding state back to the flat state, equally controlling a display configuration for each area of the flexible display.

21. The method of claim 11, further comprising:

detecting, using a sensor of the electronic device, a gaze of a user;

determining, based on the detected gaze, that the user is gazing at the first area of the flexible display; and based on the determination, maintaining an amount of electrical power for a display of the first area.

22. The method of claim 21, further comprising:

based on the determination that the user is gazing at the first area of the flexible display, reducing an amount of electrical power for a display of the second area of the flexible display.

* * * * *